United States Patent
Wang et al.

(10) Patent No.: US 9,713,101 B2
(45) Date of Patent: Jul. 18, 2017

(54) ACCESS METHOD AND DEVICE

(71) Applicant: Huawei Technologies Co., Ltd., Shenzhen, Guangdong (CN)

(72) Inventors: Jianguo Wang, Bonn (DE); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 14/715,037

(22) Filed: May 18, 2015

(65) Prior Publication Data

US 2015/0249961 A1  Sep. 3, 2015

Related U.S. Application Data

(63) Continuation of application No. PCT/CN2012/084724, filed on Nov. 16, 2012.

(51) Int. Cl.
*H04W 4/00* (2009.01)
*H04B 7/216* (2006.01)
(Continued)

(52) U.S. Cl.
CPC ........ *H04W 52/244* (2013.01); *H04B 7/0639* (2013.01); *H04B 17/309* (2015.01);
(Continued)

(58) Field of Classification Search
CPC ... H04J 11/0053; H04B 7/0456; H04L 5/0048
See application file for complete search history.

(56) References Cited

U.S. PATENT DOCUMENTS

2007/0207812 A1*  9/2007  Borran ............... H04L 1/1829
                                                         455/452.1
2011/0032839 A1   2/2011  Chen et al.
(Continued)

FOREIGN PATENT DOCUMENTS

| CN | 102291229 A | 12/2011 |
| CN | 102291740 A | 12/2011 |

(Continued)

OTHER PUBLICATIONS

"Technology Issues for Heterogeneous Network for LTE-A", Alcatel-Lucent, 3GPP TSG RAN WG1 #58bis, Oct. 12-16, 2009, 5 pages, R1-093788.
(Continued)

*Primary Examiner* — Melanie Jagannathan

(57) ABSTRACT

Embodiments of the present application provide an access method and device. In the embodiments of the present application, a terminal obtains, according to reference signals sent by a first transmission point and a second transmission point and a first precoding matrix, quality information of the reference signals after a channel corresponding to each transmission point is precoded, so that the terminal is capable of obtaining quality information of precoded reference signals more accurately and the first transmission point switches the terminal to an appropriate second transmission point, thereby implementing flow distribution between all transmission points and improving access reliability of the terminal.

17 Claims, 5 Drawing Sheets

(51) Int. Cl.
*H04W 52/24* (2009.01)
*H04W 36/00* (2009.01)
*H04B 7/06* (2006.01)
*H04L 1/00* (2006.01)
*H04W 24/04* (2009.01)
*H04W 72/04* (2009.01)
*H04B 17/309* (2015.01)
*H04L 5/00* (2006.01)

(52) U.S. Cl.
CPC .............. *H04L 1/0023* (2013.01); *H04L 5/00* (2013.01); *H04W 24/04* (2013.01); *H04W 36/0083* (2013.01); *H04W 72/0426* (2013.01); *H04B 7/0632* (2013.01); *H04B 7/0665* (2013.01)

(56) References Cited

U.S. PATENT DOCUMENTS

| | | | | |
|---|---|---|---|---|
| 2011/0045782 A1* | 2/2011 | Shin | ............. | H04B 7/0417 455/67.13 |
| 2011/0216817 A1* | 9/2011 | Kim | ............. | H04B 7/0632 375/224 |
| 2011/0244877 A1* | 10/2011 | Farajidana | ............. | H04L 5/0023 455/452.2 |
| 2011/0317656 A1 | 12/2011 | Rajih et al. | | |
| 2012/0113851 A1 | 5/2012 | Schober et al. | | |
| 2012/0207105 A1* | 8/2012 | Geirhofer | ............. | H04L 5/0032 370/329 |
| 2012/0218968 A1* | 8/2012 | Kim | ............. | H04B 7/024 370/329 |
| 2012/0281567 A1* | 11/2012 | Gao | ............. | H04B 7/0626 370/252 |
| 2012/0287799 A1* | 11/2012 | Chen | ............. | H04B 7/024 370/252 |
| 2013/0003788 A1* | 1/2013 | Marinier | ............. | H04B 7/024 375/219 |
| 2014/0064109 A1* | 3/2014 | Krishnamurthy | .... | H04J 11/0053 370/252 |
| 2014/0177601 A1* | 6/2014 | Nishio | ............. | H04W 24/10 370/332 |
| 2014/0226623 A1* | 8/2014 | Seo | ............. | H04W 36/0055 370/331 |

FOREIGN PATENT DOCUMENTS

| | | |
|---|---|---|
| CN | 102461000 A | 5/2012 |
| CN | 102696272 A | 9/2012 |
| EP | 2 698 940 A1 | 2/2014 |
| WO | WO 2012/141257 A1 | 10/2012 |

OTHER PUBLICATIONS

"Definition of Measurements for CoMP Resource Management", Ericsson, 3GPP TSG-RAN WG1 #69, May 21-30, 2012, 4 pages, R1-122841.

\* cited by examiner

ACCESS METHOD AND DEVICE

CROSS-REFERENCE TO RELATED APPLICATIONS

This application is a continuation of International Application No. PCT/CN2012/084724, filed on Nov. 16, 2012, which is hereby incorporated by reference in its entirety.

TECHNICAL FIELD

The present application relates to communications technologies, and in particular, to an access method and device.

BACKGROUND

In a radio communications system, for example, in a heterogeneous network deployment scenario, one cell identifier may be corresponding to one transmission point (Transmission Point, TP), or one cell identifier may further be corresponding to multiple TPs, and each TP generally has a different reference signal (Reference Signal, RS) resource, which can be distinguished by using a different index, such as a virtual identifier. The TP may include an access point (Access Point, AP), a macro base station, or a low-power node, such as a micro base station (Micro), a pico base station (Pico), a remote radio head (Remote Radio Head, RRH), a relay device (Relay), and a femto base station (Femto). Each TP needs to send, to a terminal, RS configuration information that indicates an RS resource corresponding to the TP, so that the terminal is capable of receiving an RS by using the RS configuration information and measuring a channel between the terminal and the corresponding TP by using the RS. A TP currently accessed by the terminal receives a measurement result reported by the terminal, and cell range expansion (Cell Range Expansion, CRE) is used to introduce a cell handover offset, so that the terminal accesses one or more other TPs. This implements load distribution of the TP, and throughput of the radio communications system can be increased.

However, an existing access method may cause a terminal to access an inappropriate TP (such as an RRH); that is, a channel between the terminal and one or more other TPs (such as a macro base station in the heterogeneous network deployment scenario) may cause relatively strong interference in a channel between the terminal and the TP, so that the terminal cannot normally carry out a communications service by using the TP, thereby reducing access reliability of the terminal.

SUMMARY

Multiple aspects of the present application provide an access method and device, so as to improve access reliability of a terminal.

One aspect of the present application provides an access method, including:

obtaining, by a terminal, at least two reference signal resources, where the at least two reference signal resources are respectively corresponding to a first transmission point and at least one second transmission point and the first transmission point is a transmission point currently accessed by the terminal;

receiving, by the terminal, reference signals by using the at least two reference signal resources;

obtaining, by the terminal, quality information of the reference signals according to a first precoding matrix and the reference signals; and sending, by the terminal, the quality information of the reference signals to the first transmission point, so that the first transmission point instructs the terminal to access a second transmission point.

According to the foregoing aspect and any possible implementation manner, an implementation manner is further provided, where the reference signal resources include one or more of the following: a CSI RS resource, a DM RS resource, and a CRS resource.

According to the foregoing aspect and any possible implementation manner, an implementation manner is further provided, where the receiving, by the terminal, reference signals by using the at least two reference signal resources includes:

receiving, by the terminal, a reference signal set or a reference signal subset corresponding to the at least two reference signal resources by using the at least two reference signal resources.

According to the foregoing aspect and any possible implementation manner, an implementation manner is further provided, where before the obtaining, by the terminal, quality information of the reference signals according to a first precoding matrix and the reference signals, the method further includes:

receiving, by the terminal, first indication information sent by the first transmission point, where the first indication information is used to indicate the first precoding matrix.

According to the foregoing aspect and any possible implementation manner, an implementation manner is further provided, where the quality information of the reference signals includes one or more of the following: RSRP, RSRQ, an RSSI, and a CQI.

According to the foregoing aspect and any possible implementation manner, an implementation manner is further provided, where after the terminal accesses the second transmission point, the method further includes:

receiving, by the terminal, second indication information sent by the second transmission point, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point; and sending, by the terminal, fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

According to the foregoing aspect and any possible implementation manner, an implementation manner is further provided, where the method further includes:

sending, by the first transmission point, the third indication information to the second transmission point through an X2 interface.

Another aspect of the present application provides an access method, including:

sending, by a first transmission point, first indication information to a terminal, where the first indication information is used to indicate a first precoding matrix, the first precoding matrix is used to adjust quality of reference signals that are received by the terminal, the reference signals are received by the terminal according to at least two reference signal resources, the at least two reference signal resources are respectively corresponding to different transmission units, the transmission units include the first transmission point and at least one second transmission point, and the first transmission point is a transmission point currently accessed by the terminal;

receiving, by the first transmission point, quality information of the reference signals that is sent by the terminal, where the quality information of the reference signals is obtained by the terminal according to the reference signals and the first precoding matrix that is indicated by the first indication information; and instructing, by the first transmission point according to the quality information of the reference signals, the terminal to access a second transmission point.

According to the foregoing aspect and any possible implementation manner, an implementation manner is further provided, where the reference signal resources include one or more of the following: a CSI RS resource, a DM RS resource, and a CRS resource.

According to the foregoing aspect and any possible implementation manner, an implementation manner is further provided, where the reference signals include a reference signal set or a reference signal subset corresponding to the at least two reference signal resources.

According to the foregoing aspect and any possible implementation manner, an implementation manner is further provided, where the quality information of the reference signals includes one or more of the following: RSRP, RSRQ, an RSSI, and a CQI.

According to the foregoing aspect and any possible implementation manner, an implementation manner is further provided, where after the terminal accesses the second transmission point, the method further includes:

sending, by the first transmission point, third indication information to the second transmission point, where the third indication information is used to indicate a second precoding matrix or a subset of the second precoding matrix that matches a first channel and is used by the first transmission point, so that:

the second transmission point determines second indication information according to the third indication information, where the second indication information is used to indicate the second precoding matrix or the subset of the second precoding matrix that matches the first channel and is used by the first transmission point; and the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

According to the foregoing aspect and any possible implementation manner, an implementation manner is further provided, where the sending, by the first transmission point, third indication information to the second transmission point includes:

sending, by the first transmission point, the third indication information to the second transmission point through an X2 interface.

Another aspect of the present application provides a terminal, including:

a receiving unit, configured to obtain at least two reference signal resources, where the at least two reference signal resources are respectively corresponding to a first transmission point and at least one second transmission point, the first transmission point is a transmission point currently accessed by the terminal, where the receiving unit is further configured to receive reference signals by using the at least two reference signal resources, and transmit the reference signals to a processing unit;

the processing unit, configured to obtain quality information of the reference signals according to a first precoding matrix and the reference signals and transmit the quality information of the reference signals to a sending unit; and the sending unit, configured to send the quality information of the reference signals to the first transmission point, so that the first transmission point instructs the terminal to access a second transmission point.

According to the foregoing aspect and any possible implementation manner, an implementation manner is further provided, where the reference signal resources obtained by the receiving unit include one or more of the following: a CSI RS resource, a DM RS resource, and a CRS resource.

According to the foregoing aspect and any possible implementation manner, an implementation manner is further provided, where the receiving unit is specifically configured to:

use the at least two reference signal resources to receive a reference signal set or a reference signal subset corresponding to the at least two reference signal resources.

According to the foregoing aspect and any possible implementation manner, an implementation manner is further provided, where the receiving unit is further configured to:
receive first indication information sent by the first transmission point, where the first indication information is used to indicate the first precoding matrix.

According to the foregoing aspect and any possible implementation manner, an implementation manner is further provided, where the quality information of the reference signals that is obtained by the processing unit includes one or more of the following: RSRP, RSRQ, an RSSI, and a CQI.

According to the foregoing aspect and any possible implementation manner, an implementation manner is further provided, where:
the receiving unit is further configured to:
after the terminal accesses the second transmission point, receive second indication information sent by the second transmission point, and transmit the second indication information to the sending unit, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point; and
the sending unit is further configured to:
send fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

Another aspect of the present application provides a transmission point, including:
a sending unit, configured to send first indication information to a terminal, where the first indication information is used to indicate a first precoding matrix, the first precoding matrix is used to adjust quality of reference signals that are received by the terminal, the reference signals are received by the terminal according to at least two reference signal resources, the at least two reference signal resources are respectively corresponding to different transmission units, the transmission units include the transmission point and at least one second transmission point, and the transmission point is a transmission point currently accessed by the terminal;
a receiving unit, configured to receive quality information of the reference signals that is sent by the terminal and transmit the quality information of the reference signals to a processing unit, where the quality information of the reference signals is obtained by the terminal according to the reference signals and the first precoding matrix that is indicated by the first indication information; and
the processing unit, configured to instruct, according to the quality information of the reference signals, the terminal to access a second transmission point.

According to the foregoing aspect and any possible implementation manner, an implementation manner is further provided, where the reference signal resources include one or more of the following: a CSI RS resource, a DM RS resource, and a CRS resource.

According to the foregoing aspect and any possible implementation manner, an implementation manner is further provided, where the reference signals include a reference signal set or a reference signal subset corresponding to the at least two reference signal resources.

According to the foregoing aspect and any possible implementation manner, an implementation manner is further provided, where the quality information of the reference signals that is received by the receiving unit includes one or more of the following: RSRP, RSRQ, an RSSI, and a CQI.

According to the foregoing aspect and any possible implementation manner, an implementation manner is further provided, where the sending unit is further configured to:
after the terminal accesses the second transmission point, send third indication information to the second transmission point, where the third indication information is used to indicate a second precoding matrix or a subset of the second precoding matrix that matches a first channel and is used by the transmission point, so that:
the second transmission point determines second indication information according to the third indication information, where the second indication information is used to indicate the second precoding matrix or the subset of the second precoding matrix that matches the first channel and is used by the transmission point; and
the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the transmission point in the second transmission point, where the third precoding matrix matches a second channel, the first channel is a channel between the terminal and the transmission point, and the second channel is a channel between the terminal and the second transmission point.

According to the foregoing aspect and any possible implementation manner, an implementation manner is further provided, where the sending unit is specifically configured to:
send the third indication information to the second transmission point through an X2 interface.

Another aspect of the present application provides a terminal, including:
- a receiver, configured to obtain at least two reference signal resources, where the at least two reference signal resources are respectively corresponding to a first transmission point and at least one second transmission point, the first transmission point is a transmission point currently accessed by the terminal, where
the receiver is further configured to receive reference signals by using the at least two reference signal resources, and transmit the reference signals to a processor;
the processor, configured to obtain quality information of the reference signals according to a first precoding matrix and the reference signals and transmit the quality information of the reference signals to a sender; and
the sender, configured to send the quality information of the reference signals to the first transmission point, so that the first transmission point instructs the terminal to access a second transmission point.

According to the foregoing aspect and any possible implementation manner, an implementation manner is further provided, where the reference signal resources obtained by the receiver include one or more of the following: a CSI RS resource, a DM RS resource, and a CRS resource.

According to the foregoing aspect and any possible implementation manner, an implementation manner is further provided, where the receiver is specifically configured to:
use the at least two reference signal resources to receive a reference signal set or a reference signal subset corresponding to the at least two reference signal resources.

According to the foregoing aspect and any possible implementation manner, an implementation manner is further provided, where the receiver is further configured to:
receive first indication information sent by the first transmission point, where the first indication information is used to indicate the first precoding matrix.

According to the foregoing aspect and any possible implementation manner, an implementation manner is further provided, where the quality information of the reference signals that is obtained by the processor includes one or more of the following: RSRP, RSRQ, an RSSI, and a CQI.

According to the foregoing aspect and any possible implementation manner, an implementation manner is further provided, where:
the receiver is further configured to:
after the terminal accesses the second transmission point, receive second indication information sent by the second transmission point, and transmit the second indication information to the sender, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point; and
the sender is further configured to:
send fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

Another aspect of the present application provides a transmission point, including:
a sender, configured to send first indication information to a terminal, where the first indication information is used to indicate a first precoding matrix, the first precoding matrix is used to adjust quality of reference signals that are received by the terminal, the reference signals are received by the terminal according to at least two reference signal resources, the at least two reference signal resources are respectively corresponding to different transmission units, the transmission units include the transmission point and at least one second transmission point, and the transmission point is a transmission point currently accessed by the terminal;
a receiver, configured to receive quality information of the reference signals that is sent by the terminal and transmit the quality information of the reference signals to a processor, where the quality information of the reference signals is obtained by the terminal according to the reference signals and the first precoding matrix that is indicated by the first indication information; and
the processor, configured to instruct, according to the quality information of the reference signals, the terminal to access a second transmission point.

According to the foregoing aspect and any possible implementation manner, an implementation manner is further provided, where the reference signal resources include one or more of the following: a CSI RS resource, a DM RS resource, and a CRS resource.

According to the foregoing aspect and any possible implementation manner, an implementation manner is further provided, where the reference signals include a reference signal set or a reference signal subset corresponding to the at least two reference signal resources.

According to the foregoing aspect and any possible implementation manner, an implementation manner is further provided, where the quality information of the reference signals that is received by the receiver includes one or more of the following: RSRP, RSRQ, an RSSI, and a CQI.

According to the foregoing aspect and any possible implementation manner, an implementation manner is further provided, where the sender is further configured to:
after the terminal accesses the second transmission point, send third indication information to the second transmission point, where the third indication information is used to indicate a second precoding matrix or a subset of the second precoding matrix that matches a first channel and is used by the transmission point, so that:
the second transmission point determines second indication information according to the third indication information, where the second indication information is used to indicate the second precoding matrix or the subset of the second precoding matrix that matches the first channel and is used by the transmission point; and the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the transmission point in the second transmission point, where the third precoding matrix matches a second channel, the first channel is a channel between the terminal and the transmission point, and the second channel is a channel between the terminal and the second transmission point.

According to the foregoing aspect and any possible implementation manner, an implementation manner is further provided, where the sender is specifically configured to:

send the third indication information to the second transmission point through an X2 interface.

As can be seen from the foregoing technical solutions, in the embodiments of the present application, a terminal obtains, according to reference signals sent by a first transmission point and the second transmission point and a first precoding matrix, quality information of the reference signals after a channel corresponding to each transmission point is precoded, so that the terminal is capable of obtaining quality information of precoded reference signals more accurately and the first transmission point switches the terminal to an appropriate second transmission point, thereby implementing flow distribution between all transmission points and improving access reliability of the terminal.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

Figure 1:
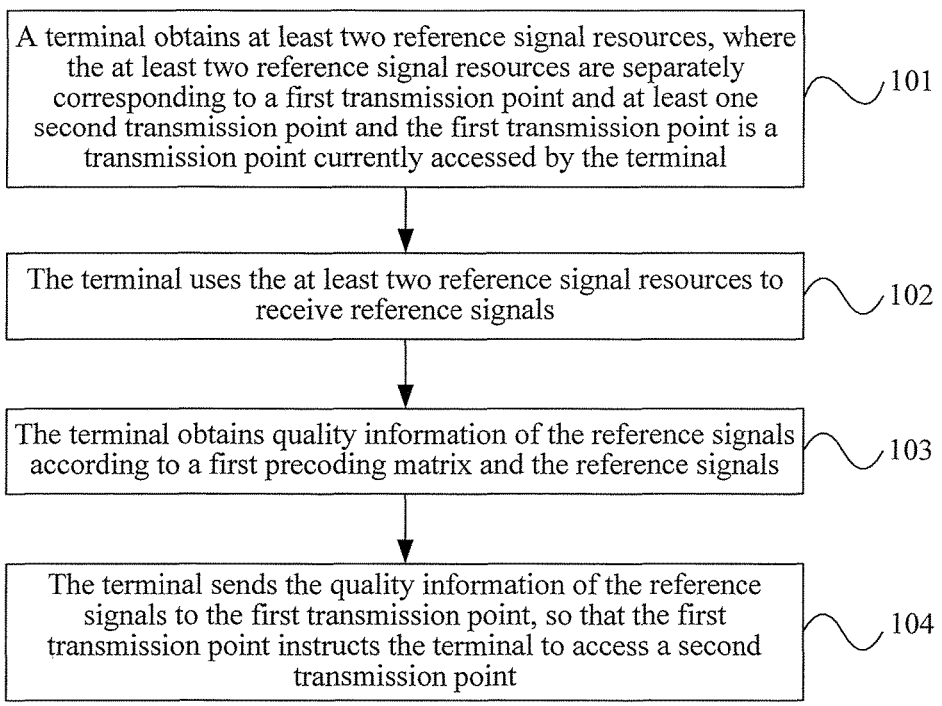
FIG. 1 is a schematic flowchart of an access method according to an embodiment of the present application.

To make the objectives, technical solutions, and advantages of the embodiments of the present application more comprehensible, the following clearly and describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The technical solutions of the present invention may be applied to various radio communications systems, such as a Global System for Mobile Communications (Global System for Mobile Communications, GSM), a General Packet Radio Service (General Packet Radio Service, GPRS) system, a Code Division Multiple Access (Code Division Multiple Access, CDMA) system, a CDMA2000 system, a Wideband Code Division Multiple Access (Wideband Code Division Multiple Access, WCDMA) system, a Long Term Evolution (Long Term Evolution, LTE) system, or a Worldwide Interoperability for Microwave Access (World Interoperability for Microwave Access, WiMAX) system.

A first transmission point or a second transmission point in the embodiments of the present invention may be a macro base station, such as a base station (Base Transceiver Station, BTS) in a GSM system, a GPRS system, or a CDMA system, a base station (NodeB) in a CDMA2000 system or a WCDMA system, an evolved base station (Evolved NodeB, eNB) in an LTE system, or a network element such as an access service network base station (Access Service Network Base Station, ASN BS) in a WiMAX network.

The first transmission point or the second transmission point in the embodiments of the present invention may also be a low-power node, such as a micro base station (Micro), a pico base station (Pico), a remote radio head (Remote Radio Head, RRH), a relay device (Relay), or a femto base station (Femto), which is not limited in the embodiments of the present invention.

The first transmission point and the second transmission point include base station antennas of active antenna systems (Active Antenna System, AAS).

A terminal in the embodiments of the present invention may be a mobile station (Mobile Station, MS) in a GSM system, a GPRS system, or a CDMA system, or a network element such as a user equipment (User Equipment, UE) in a CDMA2000 system, a WCDMA system, or an LTE system.

In addition, the term "and/or" in this specification describes only an association between associated objects and represents that three relationships may exist. For example, A and/or B may represent the following three cases: Only A exists; both A and B exist; and only B exists. In addition, the symbol "/" in this specification generally represents that the associated objects before and after the symbol are in an "or" relationship.

FIG. 1 is a schematic flowchart of an access method according to an embodiment of the present application. As shown in FIG. 1:

101. A terminal obtains at least two reference signal resources, where the at least two reference signal resources are respectively corresponding to a first transmission point and at least one second transmission point and the first transmission point is a transmission point currently accessed by the terminal.

102. The terminal uses the at least two reference signal resources to receive reference signals.

103. The terminal obtains quality information of the reference signals according to a first precoding matrix and the reference signals.

104. The terminal sends the quality information of the reference signals to the first transmission point, so that the first transmission point instructs the terminal to access a second transmission point.

In a radio communications system, for example, in a heterogeneous network deployment scenario, the first transmission point and the at least one second transmission point may have a same cell identifier, or may further have different cell identifiers. That is to say, the at least two reference signal resources may be reference signal resources respectively corresponding to multiple transmission points in one cell, or may also be reference signal resources respectively corresponding to transmission points in different cells.

Optionally, in an optional implementation manner of this embodiment, the reference signal resources may include one or more of the following: a channel state information reference signal (Channel State Information Reference Signal, CSI RS) resource, a demodulation reference signal (DeModulation Reference Signal, DM RS) resource, and a cell-specific reference signal (Cell-specific Reference Signal, CRS) resource.

For example, the CSI RS resource may be a resource configuration, or may further be a combination of a resource configuration and a subframe configuration. The resource configuration may be a resource configuration of a CSI RS in a resource block (Resource Block, RB), such as port numbers that occupy different subcarriers, symbols, or sequences; and the subframe configuration may be a period or an offset of a subframe that sends the CSI RS.

For another example, the DM RS resource may be a resource configuration, or may further be a combination of a resource configuration and a subframe configuration. The resource configuration may be a resource configuration of a DM RS in an RB, such as different port numbers; and the subframe configuration may be a period or an offset of a subframe that sends the DM RS. The subframe configuration may be predefined and be known to both the terminal and the first transmission point.

For another example, the CRS resource may be a resource configuration, or may further be a combination of a resource configuration and a subframe configuration. The resource configuration may be a resource configuration of a CRS in an RB, such as different port numbers; and the subframe configuration may be a period or an offset of a subframe that sends the CRS. The subframe configuration may be predefined and be known to both the terminal and the first transmission point.

Optionally, in an optional implementation manner of this embodiment, the terminal may specifically obtain configuration information of the at least two reference signal resources that is sent by the first transmission point by using higher layer signaling (that is, the higher layer signaling is borne by a physical downlink shared channel (Physical Downlink Shared Channel, PDSCH)) or downlink control information (that is, the downlink control information is borne by a physical downlink control channel (Physical Downlink Control Channel, PDCCH) or an enhanced PDCCH (enhanced PDCCH, ePDCCH)), and obtain, according to the configuration information of the at least two reference signal resources, the at least two reference signal resources.

For example, the higher layer signaling may be a radio resource control (Radio Resource Control, RRC) message. Specifically, the configuration information of the at least two reference signal resources may be carried by an information element (Information Element, IE) in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the configuration information of the at least two reference signal resources; or the RRC message may be different from the existing RRC message in the prior art.

For another example, the higher layer signaling may further be a media access control (Media Access Control, MAC) control element (Control Element, CE) message, and a new MAC CE is added to carry the configuration information of the at least two reference signal resources.

Optionally, in an optional implementation manner of this embodiment, in 102, the terminal may specifically use the at least two reference signal resources to receive a reference signal set or a reference signal subset corresponding to the at least two reference signal resources.

Specifically, the reference signal subset may be an indication that is sent by the first transmission point by using the higher layer signaling or the downlink control information and used to indicate that a part of reference signals are selected from the reference signal set corresponding to the reference signal resources as the reference signal subset; for example, the first reference signal or the first reference signal and the second reference signal in the reference signal set corresponding to the reference signal resources are selected as the reference signal subset.

For example, the higher layer signaling may be an RRC message. Specifically, the indication may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the indication; or the RRC message may be different from the existing RRC message in the prior art.

For another example, the higher layer signaling may further be a MAC CE message, and a new MAC CE is added to carry the indication.

Specifically, the reference signal subset may be predefined; for example, it is predefined that the first reference signal or the first reference signal and the second reference signal in the reference signal set corresponding to the reference signal resources are selected as the reference signal subset.

Optionally, in an optional implementation manner of this embodiment, before 103, the terminal may further receive first indication information (such as an index value of the first precoding matrix) sent by the first transmission point, where the first indication information is used to indicate the first precoding matrix.

Specifically, the first indication information may specifically be sent by the first transmission point to the terminal by using the higher layer signaling or the downlink control information. The first transmission point may specifically select the first precoding matrix from a predefined precoding matrix set or code book.

For example, the higher layer signaling may be an RRC message. Specifically, the first indication information may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the first indication information; or the RRC message may be different from the existing RRC message in the prior art.

For another example, the higher layer signaling may further be a MAC CE message, and a new MAC CE is added to carry the first indication information.

Specifically, the index value may be a rank indicator (Rank Indicator, RI) and a precoding matrix indicator (Precoding Matrix Indicator, PMI), or may further be a PMI, which is not limited in this embodiment.

It should be noted that the first precoding matrix may be a precoding matrix indicated by the first indication information, or may further be a part of the precoding matrix indicated by the first indication information, such as a matrix formed by a row or a column of the precoding matrix.

Optionally, in an optional implementation manner of this embodiment, before 103, the terminal may further obtain the first indication information according to a preconfiguration, for example, it is stipulated in a protocol that the first precoding matrix is selected from a predefined precoding matrix set or code book.

Specifically, the first precoding matrix may be a precoding matrix for increasing a beam tilt angle corresponding to the reference signals, so that signal quality of the terminal can be improved; or may also be a precoding matrix for decreasing the beam tilt angle corresponding to the reference signals, so that signal quality of the terminal can be lowered. Therefore, the transmission point currently accessed by the terminal may adjust associations between the terminal, particularly a terminal on the edge of coverage of the transmission point, and the transmission point and between the terminal and one or more other transmission points according to needs.

Four antenna ports are used as an example, a precoding matrix for increasing the beam tilt angle corresponding to the reference signals may be $W=([1\ e^{j\theta}\ e^{j2\theta}\ e^{j3\theta}])^T$, where $(\ )^T$ represents a transposition of a matrix or a vector, and $\theta$ represents an increment in the beam tilt angle, for example, $\theta=\pm\pi/40, \pm\pi/32, \pm\pi/30$.

It should be noted that for the reference signal resources corresponding to the first transmission point and the second transmission point, first precoding matrices corresponding to the reference signal resources may be used respectively for precoding, so that the terminal is capable of obtaining channel quality information more accurately after beam adjustment is performed for the reference signals; and the reference signal resources corresponding to the first transmission point and the second transmission point may also be reference signal resources that are not precoded according to the first precoding matrix, so that signaling overhead can be reduced.

Optionally, in an optional implementation manner of this embodiment, the quality information of the reference signals may include but is not limited to one or more of the following: reference signal received power (Reference Signal Received Power, RSRP), reference signal received quality (Reference Signal Received Quality, RSRQ), a reference signal strength indicator (Reference Signal Strength Indicator, RSSI), and a channel quality indicator (Channel Quality Indicator, CQI).

RSRP in an LTE system is used as an example to describe in detail that the UE obtains the RSRP of the reference signals according to the first precoding matrix and the reference signals. The UE may specifically obtain the RSRP of the reference signals according to a linear average of received power over a measurement bandwidth, where the received power is on a resource element (Resource Element, RE) carrying the reference signals and is obtained after precoding is performed according to the first precoding matrix.

Specifically, the UE may specifically obtain, according to the received reference signals or the reference signal subset, a channel estimation that is recorded as H, and then the UE uses the obtained first precoding matrix that is recorded as P, and obtains a channel after the channel is precoded according to the first precoding matrix, where the channel is recorded as $H_e$, that is, $H_e=HP$; and the UE obtains multiple $H_e$s according to each obtained RE carrying the reference signals, obtains corresponding received power, and performs, over a considered measurement bandwidth, linear averaging for the received power to obtain the RSRP of the reference signals.

For example, if $H_e$s obtained from a certain REk or multiple REs (that is, an RE set k) are an m×n matrix, where m is the number of receive antennas, and n is the number of transmit antenna ports after precoding is performed according to the first precoding matrix, the UE may calculate and obtain the RSRP of the reference signals according to the following formula:

$$RSRP_k = \frac{1}{mn}\sum_{i=1}^{m}\sum_{j=1}^{n}|(H_e)_{ij}|^2 \qquad (1)$$

It may be understood that the UE may further use other applicable methods to obtain the RSRP of the reference signals, for example, by multiplying an appropriate scaling factor.

In this embodiment, the first precoding matrix may be used to adjust the beam tilt angle, so that signal quality obtained by the terminal from reference signals of each transmission point can be adjusted. Therefore, the transmission point currently accessed by the terminal may adjust associations between the terminal, particularly a terminal on the edge of the coverage of transmission point, and the transmission point and between the terminal and one or more other transmission points according to a load balancing requirement. This facilitates data flow distribution between all transmission points. Meanwhile, signal quality information is obtained according to the reference signals of the first transmission point and the second transmission point and the first precoding matrix after a channel corresponding to each transmission point is precoded, so that the terminal is capable of obtaining the quality information of the reference signals more accurately.

Optionally, in an optional implementation manner of this embodiment, in 104, the terminal may specifically send the quality information of the reference signals to the first transmission point by using higher layer signaling, a physical uplink control channel (Physical Uplink Control Channel, PUCCH), or a physical uplink shared channel (Physical Uplink Shared Channel, PUSCH).

For example, the higher layer signaling may be an RRC message. Specifically, the quality information of the reference signals may be carried by an IE in the RRC message. The RRC message may be an RRC message in the prior art, such as an RRC connection reconfiguration complete (RRC CONNECTION RECONFIGURATION COMPLETE) message, which is not limited in this embodiment, and an IE of an existing RRC message is extended to carry the quality information of the reference signals; or the RRC message may be different from the existing RRC message in the prior art.

For another example, the higher layer signaling may further be a MAC CE message, and a new MAC CE is added to carry the quality information of the reference signals.

In this embodiment, a terminal obtains, according to reference signals sent by a first transmission point and the second transmission point and a first precoding matrix, quality information of the reference signals after a channel corresponding to each transmission point is precoded, so that the terminal is capable of obtaining quality information of precoded reference signals more accurately and the first transmission point switches the terminal to an appropriate second transmission point, thereby implementing flow distribution between all transmission points and improving access reliability of the terminal.

Figure 2:
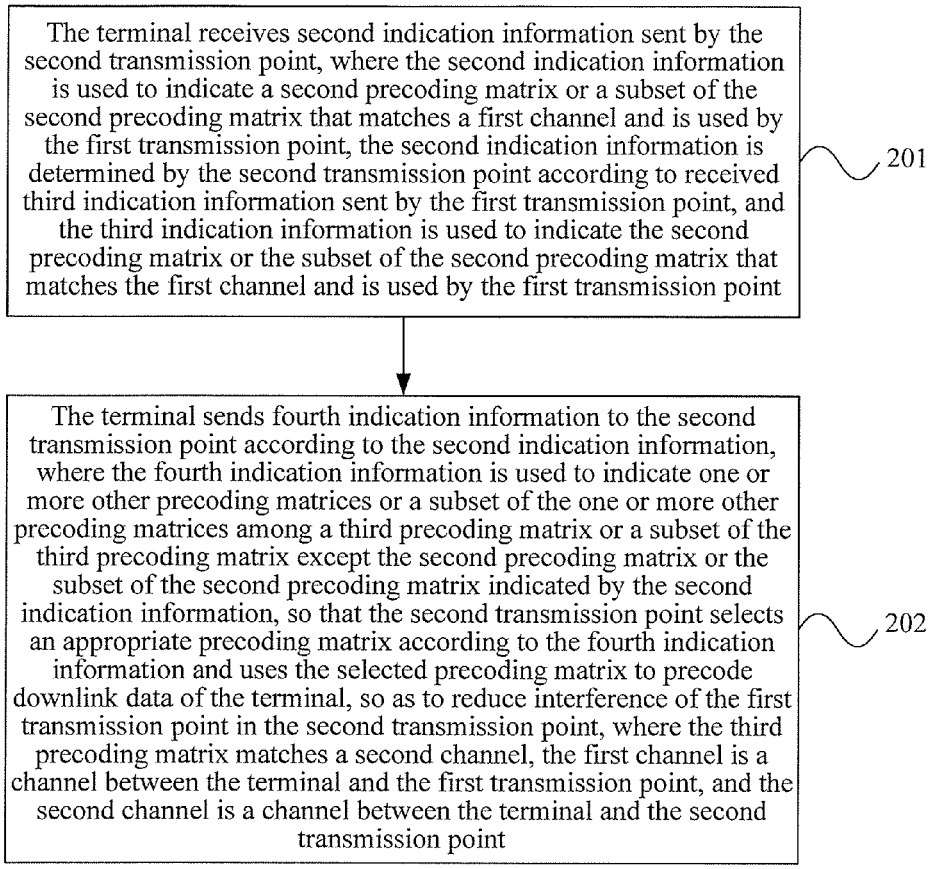
FIG. 2 is a schematic flowchart of an access method according to another embodiment of the present application.

FIG. 2 is a schematic flowchart of an access method according to another embodiment of the present application. As shown in FIG. 2, compared with the embodiment corresponding to FIG. 1, after 104, the access method provided in this embodiment may further include:

201. The terminal receives second indication information sent by the second transmission point, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point.

202. The terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

The second precoding matrix indicated by the second indication information may include but is not limited to a precoding matrix prohibited from use, a used precoding matrix, or a precoding matrix used to indicate interference.

Specifically, the second indication information may be an index value of the second precoding matrix, and the fourth indication information may be an index value of the one or more other precoding matrices. Specifically, the index value may be a rank indicator (Rank Indicator, RI) and a precoding matrix indicator (Precoding Matrix Indicator, PMI), or may further be a PMI, which is not limited in this embodiment.

Optionally, in an optional implementation manner of this embodiment, the second precoding matrix may include but is not limited to a precoding matrix of the first transmission point over each physical resource block (Physical Resource Block, PRB), a subband, or a system bandwidth.

Optionally, in an optional implementation manner of this embodiment, the third precoding matrix may include but is not limited to a precoding matrix of the second transmission point over each physical resource block (Physical Resource Block, PRB), a subband, or a system bandwidth.

Optionally, in an optional implementation manner of this embodiment, the first transmission point may specifically send the third indication information to the second transmission point through an X2 interface.

Optionally, the first transmission point may further send the third indication information to the second transmission point by using other signaling or backhaul manners, which are not limited in this embodiment.

Optionally, in an optional implementation manner of this embodiment, the one or more other precoding matrices or the subset of the one or more other precoding matrices indicated by the fourth indication information is a matrix or a subset of the matrix among the third precoding matrix or the subset of the third precoding matrix except the second precoding matrix or the subset of the second precoding matrix indicated by the second indication information, where the third precoding matrix matches the second channel. For example, the one or more other precoding matrices or the subset of the one or more other precoding matrices may be a precoding matrix or a subset of the precoding matrix that is among the third precoding matrix or the subset of the third precoding matrix and is orthogonal to or quasi-orthogonal to the second precoding matrix or the subset of the second precoding matrix, where the third precoding matrix matches the second channel.

Specifically, the second precoding matrix or the subset of the second precoding matrix that matches the first channel and is used by the first transmission point and indicated by the second indication information is recorded as P.

For example, the terminal may determine, according to the equation (2), the one or more other precoding matrices or the subset of the one or more other precoding matrices indicated by the fourth indication information:

$$y = H_3 VS + n \quad (2)$$

where, y is a received signal vector, $H_3$ is a channel matrix between the terminal and the second transmission point, V is the one or more other precoding matrices or the subset of the one or more other precoding matrices, S is a modulation symbol vector transmitted by the second transmission point, and n is interference and noise.

Specifically, V is a matrix or a subset of the matrix among the third precoding matrix or the subset of the third precoding matrix except P, such as a matrix or a subset of the matrix orthogonal to or quasi-orthogonal to P, where the third precoding matrix matches the second channel.

For another example, the terminal may determine, according to the equation (3), the one or more other precoding matrices or the subset of the one or more other precoding matrices indicated by the fourth indication information:

$$y = H_3 VS + H_4 Pq + n \quad (3)$$

where, y is a received signal vector, $H_3$ is a channel matrix between the terminal and the second transmission point, $H_4$ is a channel matrix between the terminal and the first transmission point, $\nabla$ is the one or more other precoding matrices or the subset of the one or more other precoding matrices, S is a modulation symbol vector transmitted by the first transmission point, and n is interference and noise. Specifically, $H_4Pq$ is used as an item of interference in the terminal.

The one or more other precoding matrices or the subset of the one or more other precoding matrices indicated by the fourth indication information is calculated and obtained according to the equation (2) or (3) and based on a capacity or throughput maximization criterion or other criteria. For detailed descriptions, reference may be made to related content in the prior art, and therefore details are not described herein again.

In this embodiment, a terminal receives second indication information sent by the second transmission point to which the terminal switches, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point, so that the terminal is capable of feeding back an available precoding matrix more accurately to the second transmission point according to the second precoding matrix or the subset of the second precoding matrix that matches the first channel and is used by the first transmission point, and is capable of effectively avoiding interference in the terminal caused by the second precoding matrix that matches the first channel and is used by the first transmission point, thereby further improving throughput of the terminal and the second transmission point.

Figure 3:
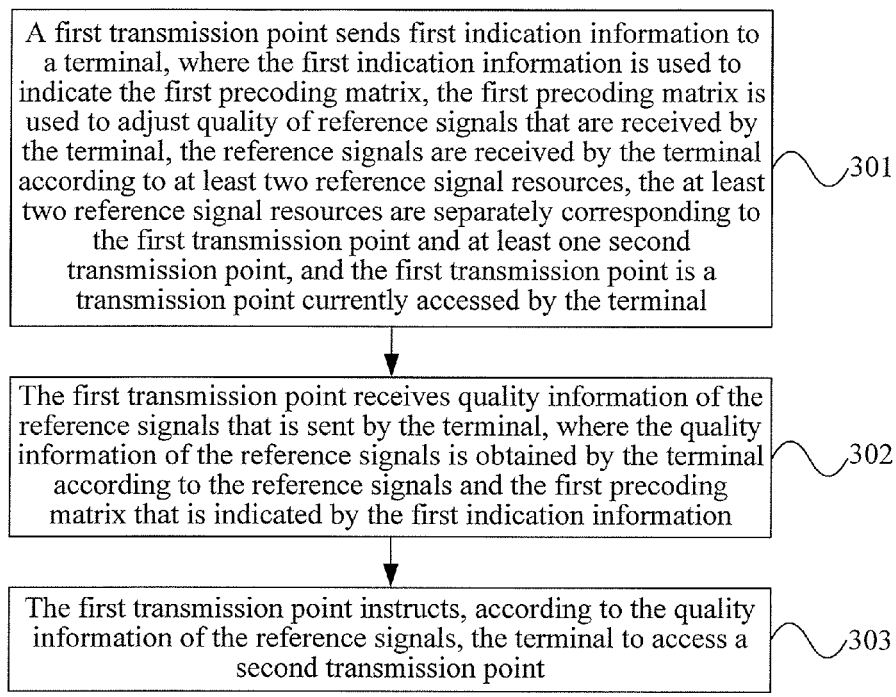
FIG. 3 is a schematic flowchart of an access method according to another embodiment of the present application.

FIG. 3 is a schematic flowchart of an access method according to another embodiment of the present application. As shown in FIG. 3:

301. A first transmission point sends first indication information (for example, an index value of the first precoding matrix) to a terminal, where the first indication information is used to indicate the first precoding matrix, the first precoding matrix is used to adjust quality of reference signals that are received by the terminal, the reference signals are received by the terminal according to at least two reference signal resources, the at least two reference signal resources are respectively corresponding to different transmission units, the transmission units include the first transmission point and at least one second transmission point, and the first transmission point is a transmission point currently accessed by the terminal.

302. The first transmission point receives quality information of the reference signals that is sent by the terminal, where the quality information of the reference signals is obtained by the terminal according to the reference signals and the first precoding matrix that is indicated by the first indication information.

303. The first transmission point instructs, according to the quality information of the reference signals, the terminal to access a second transmission point.

In a radio communications system, for example, in a heterogeneous network deployment scenario, the first transmission point and the at least one second transmission point may have a same cell identifier, or may further have different cell identifiers. That is to say, the at least two reference signal resources may be reference signal resources respectively corresponding to multiple transmission points in one cell, or may also be reference signal resources respectively corresponding to transmission points in different cells.

Optionally, in an optional implementation manner of this embodiment, the reference signal resources may include one or more of the following: a channel state information reference signal (Channel State Information Reference Signal, CSI RS) resource, a demodulation reference signal (DeModulation Reference Signal, DM RS) resource, and a cell-specific reference signal (Cell-specific Reference Signal, CRS) resource.

For example, the CSI RS resource may be a resource configuration, or may further be a combination of a resource configuration and a subframe configuration. The resource configuration may be a resource configuration of a CSI RS in a resource block (Resource Block, RB), such as port numbers that occupy different subcarriers, symbols, or sequences; and the subframe configuration may be a period or an offset of a subframe that sends the CSI RS.

For another example, the DM RS resource may be a resource configuration, or may further be a combination of a resource configuration and a subframe configuration. The resource configuration may be a resource configuration of a DM RS in an RB, such as different port numbers; and the subframe configuration may be a period or an offset of a subframe that sends the DM RS. The subframe configuration may be predefined and be known to both the terminal and the first transmission point.

For another example, the CRS resource may be a resource configuration, or may further be a combination of a resource configuration and a subframe configuration. The resource configuration may be a resource configuration of a CRS in an RB, such as different port numbers; and the subframe configuration may be a period or an offset of a subframe that sends the CRS. The subframe configuration may be predefined and be known to both the terminal and the first transmission point.

Optionally, in an optional implementation manner of this embodiment, the first transmission point may specifically send configuration information of the at least two reference signal resources to the terminal by using higher layer signaling (that is, the higher layer signaling is borne by a physical downlink shared channel (Physical Downlink Shared Channel, PDSCH)) or downlink control information (that is, the downlink control information is borne by a physical downlink control channel (Physical Downlink Control Channel, PDCCH) or an enhanced PDCCH (enhanced PDCCH, ePDCCH)), so that the terminal obtains the at least two reference signal resources according to the configuration information of the at least two reference signal resources.

For example, the higher layer signaling may be a radio resource control (Radio Resource Control, RRC) message. Specifically, the configuration information of the at least two reference signal resources may be carried by an information element (Information Element, IE) in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the configuration information of the at least two reference signal resources; or the RRC message may also be different from the existing RRC message in the prior art.

For another example, the higher layer signaling may further be a media access control (Media Access Control, MAC) control element (Control Element, CE) message, and a new MAC CE is added to carry the configuration information of the at least two reference signal resources.

Optionally, in an optional implementation manner of this embodiment, the reference signals may include but are not limited to a reference signal set or a reference signal subset corresponding to the at least two reference signal resources. Specifically, the terminal may specifically use the at least two reference signal resources to receive the reference signal set or the reference signal subset corresponding to the at least two reference signal resources.

Specifically, the reference signal subset may be an indication that is sent by the first transmission point by using the higher layer signaling or the downlink control information and used to indicate that a part of reference signals are selected from the reference signal set corresponding to the reference signal resources as the reference signal subset; for example, the first reference signal or the first reference signal and the second reference signal in the reference signal set corresponding to the reference signal resources are selected as the reference signal subset.

For example, the higher layer signaling may be an RRC message. Specifically, the indication may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the indication; or the RRC message may also be different from the existing RRC message in the prior art.

For another example, the higher layer signaling may further be a MAC CE message, and a new MAC CE is added to carry the indication.

Specifically, the reference signal subset may be predefined; for example, it is predefined that the first reference signal or the first reference signal and the second reference signal in the reference signal set corresponding to the reference signal resources are selected as the reference signal subset.

Specifically, in 301, the first indication information may specifically be sent by the first transmission point to the terminal by using the higher layer signaling or the downlink control information. The first transmission point may specifically select the first precoding matrix from a predefined precoding matrix set or code book.

For example, the higher layer signaling may be an RRC message. Specifically, the first indication information may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the first indication information; or the RRC message may also be different from the existing RRC message in the prior art.

For another example, the higher layer signaling may further be a MAC CE message, and a new MAC CE is added to carry the first indication information.

Specifically, the index value may be a rank indicator (Rank Indicator, RI) and a precoding matrix indicator (Precoding Matrix Indicator, PMI), or may further be a PMI, which is not limited in this embodiment.

It should be noted that the first precoding matrix may be a precoding matrix indicated by the first indication information, or may further be a part of the precoding matrix indicated by the first indication information, such as a matrix formed by a row or a column of the precoding matrix.

Specifically, the first precoding matrix may be a precoding matrix for increasing a beam tilt angle corresponding to the reference signals, so that signal quality of the terminal can be improved; or may also be a precoding matrix for decreasing the beam tilt angle corresponding to the reference signals, so that signal quality of the terminal can be lowered. Therefore, the transmission point currently accessed by the terminal may adjust associations between the terminal, particularly a terminal on the edge of coverage of the transmission point, and the transmission point and between the terminal and one or more other transmission points according to needs.

It should be noted that for the reference signal resources corresponding to the first transmission point and the second transmission point, first precoding matrices corresponding to the reference signal resources may be used respectively for precoding, so that the terminal is capable of obtaining channel quality information more accurately after beam adjustment is performed for the reference signals; and the reference signal resources corresponding to the first transmission point and the second transmission point may also be reference signal resources that are not precoded according to the first precoding matrix, so that signaling overhead can be reduced.

Optionally, in an optional implementation manner of this embodiment, the quality information of the reference signals may include but is not limited to one or more of the following: reference signal received power (Reference Signal Received Power, RSRP), reference signal received quality (Reference Signal Received Quality, RSRQ), a reference signal strength indicator (Reference Signal Strength Indicator, RSSI), and a channel quality indicator (Channel Quality Indicator, CQI).

RSRP in an LTE system is used as an example to describe in detail that the UE obtains the RSRP of the reference signals according to the first precoding matrix and the reference signals. The UE may specifically obtain the RSRP of the reference signals according to a linear average of received power over a measurement bandwidth, where the received power is on a resource element (Resource Element, RE) carrying the reference signals and is obtained after precoding is performed according to the first precoding matrix.

Specifically, the UE may specifically obtain, according to the received reference signals or the reference signal subset, a channel estimation that is recorded as H, and then the UE uses the obtained first precoding matrix that is recorded as P, and obtains a channel after the channel is precoded according to the first precoding matrix, where the channel is recorded as $H_e$, that is, $H_e$=HP; and the UE obtains multiple $H_e$s according to each obtained RE carrying the reference signals, obtains corresponding received power, and performs, over a considered measurement bandwidth, linear averaging for the received power to obtain the RSRP of the reference signals.

For example, if $H_e$s obtained from a certain REk or multiple REs (that is, an RE set k) are an m×n matrix, where m is the number of receive antennas, and n is the number of transmit antenna ports after precoding is performed according to the first precoding matrix, the UE may calculate and obtain the RSRP of the reference signals according to the following formula:

$$RSRP_k = \frac{1}{mn}\sum_{i=1}^{m}\sum_{j=1}^{n}|(H_e)_{ij}|^2 \qquad (1)$$

It should be noted that the UE may further use other applicable methods to obtain the RSRP of the reference signals, for example, by multiplying an appropriate scaling factor.

In this embodiment, the first precoding matrix may be used to adjust the beam tilt angle, so that signal quality obtained by the terminal from reference signals of each transmission point can be adjusted. Therefore, the transmission point currently accessed by the terminal may adjust associations between the terminal, particularly a terminal on the edge of the coverage of transmission point, and the transmission point and between the terminal and one or more other transmission points according to a load balancing requirement. This facilitates data flow distribution between all transmission points. Meanwhile, signal quality information is obtained according to the reference signals of the first transmission point and the second transmission point and the first precoding matrix after a channel corresponding to each transmission point is precoded, so that the terminal is capable of obtaining the quality information of the reference signals more accurately.

Optionally, in an optional implementation manner of this embodiment, in 302, the first transmission point may specifically receive the quality information of the reference signals that is sent by the terminal by using higher layer signaling, a physical uplink control channel (Physical Uplink Control Channel, PUCCH), or a physical uplink shared channel (Physical Uplink Shared Channel, PUCCH).

For example, the higher layer signaling may be an RRC message. Specifically, the quality information of the reference signals may be carried by an IE in the RRC message. The RRC message may be an RRC message in the prior art, such as an RRC connection reconfiguration complete (RRC CONNECTION RECONFIGURATION COMPLETE) message, which is not limited in this embodiment, and an IE of an existing RRC message is extended to carry the quality information of the reference signals; or the RRC message may also be different from the existing RRC message in the prior art.

For another example, the higher layer signaling may further be a MAC CE message, and a new MAC CE is added to carry the quality information of the reference signals.

In this embodiment, a terminal obtains, according to reference signals sent by a first transmission point and the second transmission point and a first precoding matrix, quality information of the reference signals after a channel corresponding to each transmission point is precoded, so that the terminal is capable of obtaining quality information of precoded reference signals more accurately and the first transmission point switches the terminal to an appropriate second transmission point, thereby implementing flow distribution between all transmission points and improving access reliability of the terminal.

Figure 4:
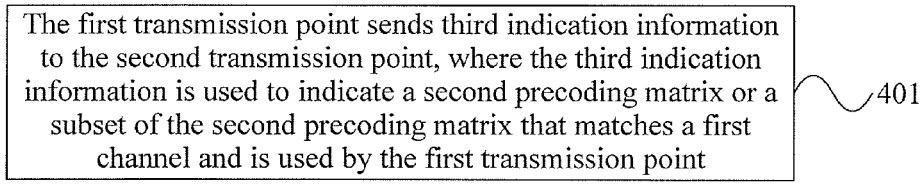
FIG. 4 is a schematic flowchart of an access method according to another embodiment of the present application.

FIG. 4 is a schematic flowchart of an access method according to another embodiment of the present application. As shown in FIG. 4, compared with the embodiment corresponding to FIG. 3, after 303, the access method provided in this embodiment may further include:

401. The first transmission point sends third indication information to the second transmission point, where the third indication information is used to indicate a second precoding matrix or a subset of the second precoding matrix that matches a first channel and is used by the first transmission point.

In this way, the second transmission point may determine second indication information according to the third indication information, where the second indication information is used to indicate the second precoding matrix or the subset of the second precoding matrix that matches the first channel and is used by the first transmission point; and the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

The second precoding matrix indicated by the second indication information may include but is not limited to a precoding matrix prohibited from use, a used precoding matrix, or a precoding matrix used to indicate interference.

Specifically, the second indication information may be an index value of the second precoding matrix, and the fourth indication information may be an index value of the one or more other precoding matrices. Specifically, the index value may be a rank indicator (Rank Indicator, RI) and a precoding matrix indicator (Precoding Matrix Indicator, PMI), or may further be a PMI, which is not limited in this embodiment.

Optionally, in an optional implementation manner of this embodiment, the second precoding matrix may include but is not limited to a precoding matrix of the first transmission point over each physical resource block (Physical Resource Block, PRB), a subband, or a system bandwidth.

Optionally, in an optional implementation manner of this embodiment, the third precoding matrix may include but is not limited to a precoding matrix of the second transmission point over each physical resource block (Physical Resource Block, PRB), a subband, or a system bandwidth.

Optionally, in an optional implementation manner of this embodiment, in 401, the first transmission point may specifically send the third indication information to the second transmission point through an X2 interface.

Optionally, the first transmission point may further send the third indication information to the second transmission point by using other signaling or backhaul manners, which are not limited in this embodiment.

Optionally, in an optional implementation manner of this embodiment, the one or more other precoding matrices or the subset of the one or more other precoding matrices indicated by the fourth indication information is a matrix or a subset of the matrix among the third precoding matrix or the subset of the third precoding matrix except the second precoding matrix or the subset of the second precoding matrix indicated by the second indication information, where the third precoding matrix matches the second channel. For example, the one or more other precoding matrices or the subset of the one or more other precoding matrices may be a precoding matrix or a subset of the precoding matrix that is among the third precoding matrix or the subset of the third precoding matrix and is orthogonal to or quasi-orthogonal to the second precoding matrix or the subset of the second precoding matrix, where the third precoding matrix matches the second channel.

Specifically, the second precoding matrix or the subset of the second precoding matrix that matches the first channel and is used by the first transmission point and indicated by the second indication information is recorded as P.

For example, the terminal may determine, according to the equation (2), the one or more other precoding matrices or the subset of the one or more other precoding matrices indicated by the fourth indication information:

$$y = H_3 VS + n \quad (2)$$

where, y is a received signal vector, $H_3$ is a channel matrix between the terminal and the second transmission point, V is the one or more other precoding matrices or the subset of the one or more other precoding matrices, S is a modulation symbol vector transmitted by the second transmission point, and n is interference and noise.

Specifically, V is a matrix or a subset of the matrix among the third precoding matrix or the subset of the third precoding matrix except P, such as a matrix or a subset of the matrix orthogonal to or quasi-orthogonal to P, where the third precoding matrix matches the second channel.

For another example, the terminal may determine, according to the equation (3), the one or more other precoding matrices or the subset of the one or more other precoding matrices indicated by the fourth indication information:

$$y = H_3 \overline{V} S + H_4 P q + n \quad (3)$$

where, y is a received signal vector, $H_3$ is a channel matrix between the terminal and the second transmission point, $H_4$ is a channel matrix between the terminal and the first transmission point, $\overline{V}$ is the one or more other precoding matrices or the subset of the one or more other precoding matrices, S is a modulation symbol vector transmitted by the first transmission point, and n is interference and noise. Specifically, $H_4 Pq$ is used as an item of interference in the terminal.

The one or more other precoding matrices or the subset of the one or more other precoding matrices indicated by the fourth indication information is calculated and obtained according to the equation (2) or (3) and based on a capacity or throughput maximization criterion or other criteria. For detailed descriptions, reference may be made to related content in the prior art, and therefore details are not described herein again.

In this embodiment, the first transmission point sends third indication information to the second transmission point, where the third indication information is used to indicate a second precoding matrix or a subset of the second precoding matrix that matches a first channel and is used by the first transmission point; and the second transmission point determines second indication information according to the third indication information and sends the second indication information to the terminal, where the second indication information is used to indicate the second precoding matrix or the subset of the second precoding matrix that matches the first channel and is used by the first transmission point, so that the terminal is capable of feeding back an available precoding matrix more accurately to the second transmission point according to the second precoding matrix or the subset of the second precoding matrix that matches the first channel and is used by the first transmission point, and is capable of effectively avoiding interference in the terminal caused by the second precoding matrix that matches the first channel and is used by the first transmission point, thereby further improving throughput of the terminal and the second transmission point.

It should be noted that, for brevity, the foregoing method embodiments are represented as a series of actions. However, a person skilled in the art should understand that the present application is not limited to the order of the described actions, because according to the present application, some steps may adopt other orders or be performed simultaneously. A person skilled in the art should also understand that the embodiments described in this specification all belong to exemplary embodiments and the involved actions and modules are not necessarily required by the present application.

In the foregoing embodiments, descriptions of each of the embodiments have their respective focuses. For a part that is not described in detail in a certain embodiment, reference may be made to related descriptions in other embodiments.

Figure 5:
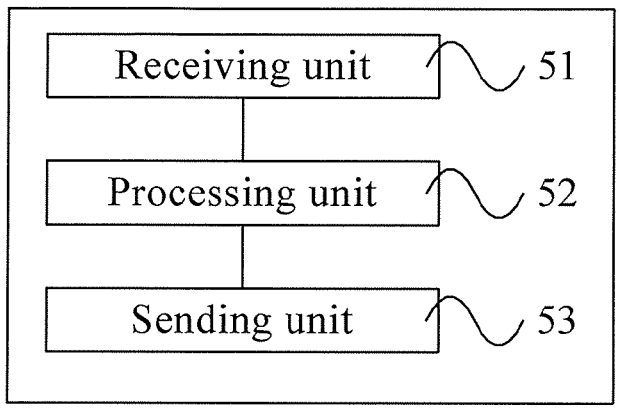
FIG. 5 is a schematic structural diagram of a terminal according to another embodiment of the present application.

FIG. 5 is a schematic structural diagram of a terminal according to another embodiment of the present application. As shown in FIG. 5, the terminal in this embodiment may include a receiving unit 51, a processing unit 52, and a sending unit 53. The receiving unit 51 is configured to obtain at least two reference signal resources, where the at least two reference signal resources are respectively corresponding to a first transmission point and at least one second transmission point, and the first transmission point is a transmission point currently accessed by the terminal; and the receiving unit 51 is further configured to receive reference signals by using the at least two reference signal resources and transmit the reference signals to the processing unit 52. The processing unit 52 is configured to obtain quality information of the reference signals according to a first precoding matrix and the reference signals and transmit the quality information of the reference signals to the sending unit 53. The sending unit 53 is configured to send the quality information of the reference signals to the first transmission point, so that the first transmission point instructs the terminal to access a second transmission point.

In a radio communications system, for example, in a heterogeneous network deployment scenario, the first transmission point and the at least one second transmission point may have a same cell identifier, or may further have different cell identifiers. That is to say, the at least two reference signal resources may be reference signal resources respectively corresponding to multiple transmission points in one cell, or may also be reference signal resources respectively corresponding to transmission points in different cells.

Optionally, in an optional implementation manner of this embodiment, the reference signal resources obtained by the receiving unit 51 may include one or more of the following: a channel state information reference signal (Channel State Information Reference Signal, CSI RS) resource, a demodulation reference signal (DeModulation Reference Signal, DM RS) resource, and a cell-specific reference signal (Cell-specific Reference Signal, CRS) resource.

For example, the CSI RS resource may be a resource configuration, or may further be a combination of a resource configuration and a subframe configuration. The resource configuration may be a resource configuration of a CSI RS in a resource block (Resource Block, RB), such as port numbers that occupy different subcarriers, symbols, or sequences; and the subframe configuration may be a period or an offset of a subframe that sends the CSI RS.

For another example, the DM RS resource may be a resource configuration, or may further be a combination of a resource configuration and a subframe configuration. The resource configuration may be a resource configuration of a DM RS in an RB, such as different port numbers; and the subframe configuration may be a period or an offset of a subframe that sends the DM RS. The subframe configuration may be predefined and be known to both the terminal and the first transmission point.

For another example, the CRS resource may be a resource configuration, or may further be a combination of a resource configuration and a subframe configuration. The resource configuration may be a resource configuration of a CRS in an RB, such as different port numbers; and the subframe configuration may be a period or an offset of a subframe that sends the CRS. The subframe configuration may be predefined and be known to both the terminal and the first transmission point.

Optionally, in an optional implementation manner of this embodiment, the receiving unit 51 may specifically obtain configuration information of the at least two reference signal resources that is sent by the first transmission point by using higher layer signaling (that is, the higher layer signaling is borne by a physical downlink shared channel (Physical Downlink Shared Channel, PDSCH)) or downlink control information (that is, the downlink control information is borne by a physical downlink control channel (Physical Downlink Control Channel, PDCCH) or an enhanced PDCCH (enhanced PDCCH, ePDCCH)), and obtain, according to the configuration information of the at least two reference signal resources, the at least two reference signal resources.

For example, the higher layer signaling may be a radio resource control (Radio Resource Control, RRC) message. Specifically, the configuration information of the at least two reference signal resources may be carried by an information element (Information Element, IE) in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the configuration information of the at least two reference signal resources; or the RRC message may also be different from the existing RRC message in the prior art.

For another example, the higher layer signaling may further be a media access control (Media Access Control, MAC) control element (Control Element, CE) message, and a new MAC CE is added to carry the configuration information of the at least two reference signal resources.

Optionally, in an optional implementation manner of this embodiment, the receiving unit 51 may be specifically configured to use the at least two reference signal resources to receive a reference signal set or a reference signal subset corresponding to the at least two reference signal resources.

Specifically, the reference signal subset may be an indication that is sent by the first transmission point by using the higher layer signaling or the downlink control information and used to indicate that a part of reference signals are selected from the reference signal set corresponding to the reference signal resources as the reference signal subset; for example, the first reference signal or the first reference signal and the second reference signal in the reference signal set corresponding to the reference signal resources are selected as the reference signal subset.

For example, the higher layer signaling may be an RRC message. Specifically, the indication may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the indication; or the RRC message may also be different from the existing RRC message in the prior art.

For another example, the higher layer signaling may further be a MAC CE message, and a new MAC CE is added to carry the indication.

Specifically, the reference signal subset may be predefined; for example, it is predefined that the first reference signal or the first reference signal and the second reference signal in the reference signal set corresponding to the reference signal resources are selected as the reference signal subset.

Optionally, in an optional implementation manner of this embodiment, the receiving unit 51 may further be configured to receive first indication information (such as an index value of the first precoding matrix) sent by the first transmission point, where the first indication information is used to indicate the first precoding matrix.

Specifically, the first indication information may specifically be sent by the first transmission point to the terminal by using the higher layer signaling or the downlink control information. The first transmission point may specifically select the first precoding matrix from a predefined precoding matrix set or code book.

For example, the higher layer signaling may be an RRC message. Specifically, the first indication information may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the first indication information; or the RRC message may also be different from the existing RRC message in the prior art.

For another example, the higher layer signaling may further be a MAC CE message, and a new MAC CE is added to carry the first indication information.

Specifically, the index value may be a rank indicator (Rank Indicator, RI) and a precoding matrix indicator (Precoding Matrix Indicator, PMI), or may further be a PMI, which is not limited in this embodiment.

It should be noted that the first precoding matrix may be a precoding matrix indicated by the first indication information, or may further be a part of the precoding matrix indicated by the first indication information, such as a matrix formed by a row or a column of the precoding matrix.

Optionally, in an optional implementation manner of this embodiment, the receiving unit 51 may further be configured to obtain the first indication information according to a preconfiguration, for example, it is stipulated in a protocol that the first precoding matrix is selected from a predefined precoding matrix set or code book.

Specifically, the first precoding matrix may be a precoding matrix for increasing a beam tilt angle corresponding to the reference signals, so that signal quality of the terminal can be improved; or may also be a precoding matrix for decreasing the beam tilt angle corresponding to the reference signals, so that signal quality of the terminal can be lowered. Therefore, the transmission point currently accessed by the terminal may adjust associations between the terminal, particularly a terminal on the edge of coverage of the transmission point, and the transmission point and between the terminal and one or more other transmission points according to needs.

It should be noted that for the reference signal resources corresponding to the first transmission point and the second transmission point, first precoding matrices corresponding to the reference signal resources may be used respectively for precoding, so that the terminal is capable of obtaining channel quality information more accurately after beam adjustment is performed for the reference signals; and the reference signal resources corresponding to the first transmission point and the second transmission point may also be reference signal resources that are not precoded according to the first precoding matrix, so that signaling overhead can be reduced.

Optionally, in an optional implementation manner of this embodiment, the quality information of the reference signals that is obtained by the processing unit 52 may include but is not limited to one or more of the following: reference signal received power (Reference Signal Received Power, RSRP), reference signal received quality (Reference Signal Received Quality, RSRQ), a reference signal strength indicator (Reference Signal Strength Indicator, RSSI), and a channel quality indicator (Channel Quality Indicator, CQI).

Optionally, in an optional implementation manner of this embodiment, the sending unit 53 may specifically send the quality information of the reference signals to the first transmission point by using higher layer signaling, a physical uplink control channel (Physical Uplink Control Channel, PUCCH), or a physical uplink shared channel (Physical Uplink Shared Channel, PUCCH).

For example, the higher layer signaling may be an RRC message. Specifically, the quality information of the reference signals may be carried by an IE in the RRC message. The RRC message may be an RRC message in the prior art, such as an RRC connection reconfiguration complete (RRC CONNECTION RECONFIGURATION COMPLETE) message, which is not limited in this embodiment, and an IE of an existing RRC message is extended to carry the quality information of the reference signals; or the RRC message may also be different from the existing RRC message in the prior art.

For another example, the higher layer signaling may further be a MAC CE message, and a new MAC CE is added to carry the quality information of the reference signals.

In this embodiment, a terminal obtains, by using a processing unit and according to reference signals sent by a first transmission point and the second transmission point and a first precoding matrix, quality information of the reference signals after a channel corresponding to each transmission point is precoded, so that the terminal is capable of obtaining quality information of precoded reference signals more accurately and the first transmission point switches the terminal to an appropriate second transmission point, thereby implementing flow distribution between all transmission points and improving access reliability of the terminal.

Optionally, in an optional implementation manner of this embodiment, the receiving unit 51 may further be configured to: after the terminal accesses the second transmission point, receive second indication information sent by the second transmission point and transmit the second indication information to the sending unit 53, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point; correspondingly, the sending unit 53 may further be configured to send fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

The second precoding matrix indicated by the second indication information may include but is not limited to a precoding matrix prohibited from use, a used precoding matrix, or a precoding matrix used to indicate interference.

Specifically, the second indication information may be an index value of the second precoding matrix, and the fourth indication information may be an index value of the one or more other precoding matrices. Specifically, the index value may be a rank indicator (Rank Indicator, RI) and a precoding matrix indicator (Precoding Matrix Indicator, PMI), or may further be a PMI, which is not limited in this embodiment.

Optionally, in an optional implementation manner of this embodiment, the second precoding matrix may include but is not limited to a precoding matrix of the first transmission point over each physical resource block (Physical Resource Block, PRB), a subband, or a system bandwidth.

Optionally, in an optional implementation manner of this embodiment, the third precoding matrix may include but is not limited to a precoding matrix of the second transmission point over each physical resource block (Physical Resource Block, PRB), a subband, or a system bandwidth.

Optionally, the first transmission point may further send the third indication information to the second transmission point by using other signaling or backhaul manners, which are not limited in this embodiment.

Optionally, in an optional implementation manner of this embodiment, the one or more other precoding matrices or the subset of the one or more other precoding matrices indicated by the fourth indication information is a matrix or a subset of the matrix among the third precoding matrix or the subset of the third precoding matrix except the second precoding matrix or the subset of the second precoding matrix indicated by the second indication information, where the third precoding matrix matches the second channel. For example, the one or more other precoding matrices or the subset of the one or more other precoding matrices may be a precoding matrix or a subset of the precoding matrix that is among the third precoding matrix or the subset of the third precoding matrix and is orthogonal to or quasi-orthogonal to the second precoding matrix or the subset of the second precoding matrix, where the third precoding matrix matches the second channel.

In this embodiment, a terminal receives, by using a receiving unit, second indication information sent by the second transmission point to which the terminal switches, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point, so that a sending unit is capable of feeding back an available precoding matrix more accurately to the second transmission point according to the second precoding matrix or the subset of the second precoding matrix that matches the first channel and is used by the first transmission point, and is capable of effectively avoiding interference in the terminal caused by the second precoding matrix that matches the first channel and is used by the first transmission point, thereby further improving throughput of the terminal and the second transmission point.

Figure 6:
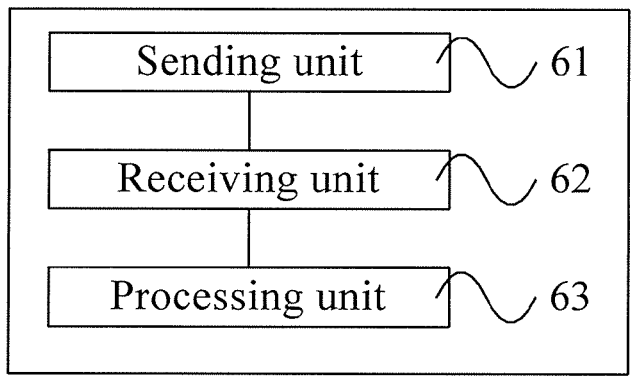
FIG. 6 is a schematic structural diagram of a transmission point according to another embodiment of the present application.

FIG. 6 is a schematic structural diagram of a transmission point according to another embodiment of the present application. As shown in FIG. 6, the transmission point in this embodiment may include a sending unit 61, a receiving unit 62, and a processing unit 63. The sending unit 61 is configured to send first indication information to a terminal, where the first indication information is used to indicate a first precoding matrix, the first precoding matrix is used to adjust quality of reference signals that are received by the terminal, the reference signals are received by the terminal according to at least two reference signal resources, the at least two reference signal resources are respectively corresponding to different transmission units, the transmission units include the transmission point and at least one second transmission point, and the transmission point is a transmission point currently accessed by the terminal. The receiving unit 62 is configured to receive quality information of the reference signals that is sent by the terminal and transmit the quality information of the reference signals to the processing unit 63, where the quality information of the reference signals is obtained by the terminal according to the reference signals and the first precoding matrix that is indicated by the first indication information. The processing unit 63 is configured to instruct, according to the quality information of the reference signals, the terminal to access a second transmission point.

In a radio communications system, for example, in a heterogeneous network deployment scenario, the transmission point and the at least one second transmission point may have a same cell identifier, or may further have different cell identifiers. That is to say, the at least two reference signal resources may be reference signal resources respectively corresponding to multiple transmission points in one cell, or may also be reference signal resources respectively corresponding to transmission points in different cells.

Optionally, in an optional implementation manner of this embodiment, the reference signal resources may include one or more of the following: a channel state information reference signal (Channel State Information Reference Signal, CSI RS) resource, a demodulation reference signal (DeModulation Reference Signal, DM RS) resource, and a cell-specific reference signal (Cell-specific Reference Signal, CRS) resource.

For example, the CSI RS resource may be a resource configuration, or may further be a combination of a resource configuration and a subframe configuration. The resource configuration may be a resource configuration of a CSI RS in a resource block (Resource Block, RB), such as port numbers that occupy different subcarriers, symbols, or sequences; and the subframe configuration may be a period or an offset of a subframe that sends the CSI RS.

For another example, the DM RS resource may be a resource configuration, or may further be a combination of a resource configuration and a subframe configuration. The resource configuration may be a resource configuration of a DM RS in an RB, such as different port numbers; and the subframe configuration may be a period or an offset of a subframe that sends the DM RS. The subframe configuration may be predefined and be known to both the terminal and the transmission point.

For another example, the CRS resource may be a resource configuration, or may further be a combination of a resource configuration and a subframe configuration. The resource configuration may be a resource configuration of a CRS in an RB, such as different port numbers; and the subframe configuration may be a period or an offset of a subframe that sends the CRS. The subframe configuration may be predefined and be known to both the terminal and the transmission point.

Optionally, in an optional implementation manner of this embodiment, the sending unit 61 may specifically send configuration information of the at least two reference signal resources to the terminal by using higher layer signaling (that is, the higher layer signaling is borne by a physical downlink shared channel (Physical Downlink Shared Channel, PDSCH)) or downlink control information (that is, the downlink control information is borne by a physical downlink control channel (Physical Downlink Control Channel, PDCCH) or an enhanced PDCCH (enhanced PDCCH, ePDCCH)), so that the terminal obtains the at least two reference signal resources according to the configuration information of the at least two reference signal resources.

For example, the higher layer signaling may be a radio resource control (Radio Resource Control, RRC) message. Specifically, the configuration information of the at least two reference signal resources may be carried by an information element (Information Element, IE) in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the configuration information of the at least two reference signal resources; or the RRC message may also be different from the existing RRC message in the prior art.

For another example, the higher layer signaling may further be a media access control (Media Access Control, MAC) control element (Control Element, CE) message, and a new MAC CE is added to carry the configuration information of the at least two reference signal resources.

Optionally, in an optional implementation manner of this embodiment, the reference signals may include but are not limited to a reference signal set or a reference signal subset corresponding to the at least two reference signal resources. Specifically, the terminal may specifically use the at least two reference signal resources to receive the reference signal set or the reference signal subset corresponding to the at least two reference signal resources.

Specifically, the reference signal subset may be an indication that is sent by the transmission point by using the higher layer signaling or the downlink control information and used to indicate that a part of reference signals are selected from the reference signal set corresponding to the reference signal resources as the reference signal subset; for example, the first reference signal or the first reference signal and the second reference signal in the reference signal set corresponding to the reference signal resources are selected as the reference signal subset.

For example, the higher layer signaling may be an RRC message. Specifically, the indication may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the indication; or the RRC message may also be different from the existing RRC message in the prior art.

For another example, the higher layer signaling may further be a MAC CE message, and a new MAC CE is added to carry the indication.

Specifically, the reference signal subset may be predefined; for example, it is predefined that the first reference signal or the first reference signal and the second reference signal in the reference signal set corresponding to the reference signal resources are selected as the reference signal subset.

Specifically, the first indication information may specifically be sent by the sending unit 61 to the terminal by using the higher layer signaling or the downlink control information. The transmission point may specifically select the first precoding matrix from a predefined precoding matrix set or code book.

For example, the higher layer signaling may be an RRC message. Specifically, the first indication information may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the first indication information; or the RRC message may also be different from the existing RRC message in the prior art.

For another example, the higher layer signaling may further be a MAC CE message, and a new MAC CE is added to carry the first indication information.

Specifically, the index value may be a rank indicator (Rank Indicator, RI) and a precoding matrix indicator (Precoding Matrix Indicator, PMI), or may further be a PMI, which is not limited in this embodiment.

It should be noted that the first precoding matrix may be a precoding matrix indicated by the first indication information, or may further be a part of the precoding matrix indicated by the first indication information, such as a matrix formed by a row or a column of the precoding matrix.

Specifically, the first precoding matrix may be a precoding matrix for increasing a beam tilt angle corresponding to the reference signals, so that signal quality of the terminal can be improved; or may also be a precoding matrix for decreasing the beam tilt angle corresponding to the reference signals, so that signal quality of the terminal can be lowered. Therefore, the transmission point currently accessed by the terminal may adjust associations between the terminal, particularly a terminal on the edge of coverage of the transmission point, and the transmission point and between the terminal and one or more other transmission points according to needs.

It should be noted that for the reference signal resources corresponding to the transmission point and the second transmission point, first precoding matrices corresponding to the reference signal resources may be used respectively for precoding, so that the terminal is capable of obtaining channel quality information more accurately after beam adjustment is performed for the reference signals; and the reference signal resources corresponding to the transmission point and the second transmission point may also be reference signal resources that are not precoded according to the first precoding matrix, so that signaling overhead can be reduced.

Optionally, in an optional implementation manner of this embodiment, the quality information of the reference signals that is received by the receiving unit 62 may include but is not limited to one or more of the following: reference signal received power (Reference Signal Received Power, RSRP), reference signal received quality (Reference Signal Received Quality, RSRQ), a reference signal strength indicator (Reference Signal Strength Indicator, RSSI), and a channel quality indicator (Channel Quality Indicator, CQI).

Optionally, in an optional implementation manner of this embodiment, the receiving unit 62 may specifically receive the quality information of the reference signals that is sent by the terminal by using higher layer signaling, a physical uplink control channel (Physical Uplink Control Channel, PUCCH), or a physical uplink shared channel (Physical Uplink Shared Channel, PUCCH).

For example, the higher layer signaling may be an RRC message. Specifically, the quality information of the reference signals may be carried by an IE in the RRC message. The RRC message may be an RRC message in the prior art, such as an RRC connection reconfiguration complete (RRC CONNECTION RECONFIGURATION COMPLETE) message, which is not limited in this embodiment, and an IE of an existing RRC message is extended to carry the quality information of the reference signals; or the RRC message may also be different from the existing RRC message in the prior art.

For another example, the higher layer signaling may further be a MAC CE message, and a new MAC CE is added to carry the quality information of the reference signals.

In this embodiment, a terminal obtains, according to reference signals sent by a transmission point and the second transmission point and a first precoding matrix, quality information of the reference signals after a channel corresponding to each transmission point is precoded, so that the terminal is capable of obtaining quality information of precoded reference signals more accurately and a processing unit switches the terminal to an appropriate second transmission point, thereby implementing flow distribution between all transmission points and improving access reliability of the terminal.

Optionally, in an optional implementation manner of this embodiment, the sending unit 61 may further be configured to send third indication information to the second transmission point after the terminal accesses the second transmission point, where the third indication information is used to indicate a second precoding matrix or a subset of the second precoding matrix that matches a first channel and is used by the transmission point, so that:

the second transmission point determines second indication information according to the third indication information, where the second indication information is used to indicate the second precoding matrix or the subset of the second precoding matrix that matches the first channel and is used by the transmission point; and the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the transmission point in the second transmission point, where the third precoding matrix matches a second channel, the first channel is a channel between the terminal and the transmission point, and the second channel is a channel between the terminal and the second transmission point.

In this way, the second transmission point may determine second indication information according to the third indication information, where the second indication information is used to indicate the second precoding matrix or the subset of the second precoding matrix that matches the first channel and is used by the transmission point; and the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the transmission point in the second transmission point, where the third precoding matrix matches a second channel, the first channel is a channel between the terminal and the transmission point, and the second channel is a channel between the terminal and the second transmission point.

The second precoding matrix indicated by the second indication information may include but is not limited to a precoding matrix prohibited from use, a used precoding matrix, or a precoding matrix used to indicate interference.

Specifically, the second indication information may be an index value of the second precoding matrix, and the fourth indication information may be an index value of the one or more other precoding matrices. Specifically, the index value may be a rank indicator (Rank Indicator, RI) and a precoding matrix indicator (Precoding Matrix Indicator, PMI), or may further be a PMI, which is not limited in this embodiment.

Optionally, in an optional implementation manner of this embodiment, the second precoding matrix may include but is not limited to a precoding matrix of the transmission point over each physical resource block (Physical Resource Block, PRB), a subband, or a system bandwidth.

Optionally, in an optional implementation manner of this embodiment, the third precoding matrix may include but is not limited to a precoding matrix of the second transmission point over each physical resource block (Physical Resource Block, PRB), a subband, or a system bandwidth.

Optionally, in an optional implementation manner of this embodiment, the sending unit 61 may be specifically configured to send the third indication information to the second transmission point through an X2 interface.

Optionally, in an optional implementation manner of this embodiment, specifically, the sending unit 61 may further send the third indication information to the second transmission point by using other signaling or backhaul manners, which are not limited in this embodiment.

Optionally, in an optional implementation manner of this embodiment, the one or more other precoding matrices or the subset of the one or more other precoding matrices indicated by the fourth indication information is a matrix or a subset of the matrix among the third precoding matrix or the subset of the third precoding matrix except the second precoding matrix or the subset of the second precoding matrix indicated by the second indication information, where the third precoding matrix matches the second channel. For example, the one or more other precoding matrices or the subset of the one or more other precoding matrices may be a precoding matrix or a subset of the precoding matrix that is among the third precoding matrix or the subset of the third precoding matrix and is orthogonal to or quasi-orthogonal to the second precoding matrix or the subset of the second precoding matrix, where the third precoding matrix matches the second channel.

In this embodiment, a transmission point sends third indication information to the second transmission point by using a sending unit, where the third indication information is used to indicate a second precoding matrix or a subset of the second precoding matrix that matches a first channel and is used by the transmission point; and the second transmission point determines second indication information according to the third indication information and sends the second indication information to the terminal, where the second indication information is used to indicate the second precoding matrix or the subset of the second precoding matrix that matches the first channel and is used by the transmission point, so that the terminal is capable of feeding back an available precoding matrix more accurately to the second transmission point according to the second precoding matrix or the subset of the second precoding matrix that matches the first channel and is used by the transmission point, and is capable of effectively avoiding interference in the terminal caused by the second precoding matrix that matches the first channel and is used by the transmission point, thereby further improving throughput of the terminal and the second transmission point.

Figure 7:
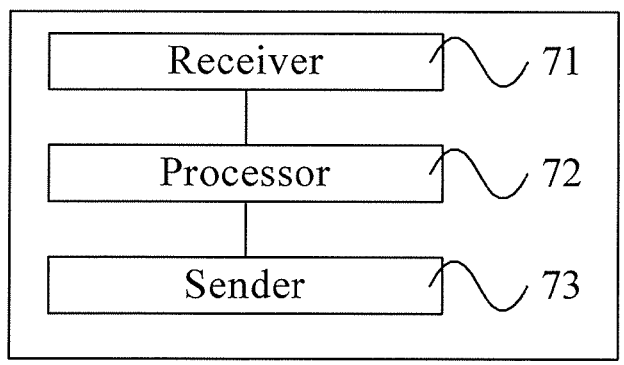
FIG. 7 is a schematic structural diagram of a terminal according to another embodiment of the present application.

FIG. 7 is a schematic structural diagram of a terminal according to another embodiment of the present application. As shown in FIG. 7, the terminal in this embodiment may include a receiver 71, a processor 72, and a sender 73. The receiver 71 is configured to obtain at least two reference signal resources, where the at least two reference signal resources are respectively corresponding to different transmitters, where the transmitters include a first transmission point and at least one second transmission point and the first transmission point is a transmission point currently accessed by the terminal; and the receiver 71 is further configured to receive reference signals by using the at least two reference signal resources and transmit the reference signals to the processor 72. The processor 72 is configured to obtain quality information of the reference signals according to a first precoding matrix and the reference signals and transmit the quality information of the reference signals to the sender 73. The sender 73 is configured to send the quality information of the reference signals to the first transmission point, so that the first transmission point instructs the terminal to access a second transmission point.

In a radio communications system, for example, in a heterogeneous network deployment scenario, the first transmission point and the at least one second transmission point may have a same cell identifier, or may further have different cell identifiers. That is to say, the at least two reference signal resources may be reference signal resources respectively corresponding to multiple transmission points in one cell, or may also be reference signal resources respectively corresponding to transmission points in different cells.

Optionally, in an optional implementation manner of this embodiment, the reference signal resources obtained by the receiver 71 may include one or more of the following: a channel state information reference signal (Channel State Information Reference Signal, CSI RS) resource, a demodulation reference signal (DeModulation Reference Signal, DM RS) resource, and a cell-specific reference signal (Cell-specific Reference Signal, CRS) resource.

For example, the CSI RS resource may be a resource configuration, or may further be a combination of a resource configuration and a subframe configuration. The resource configuration may be a resource configuration of a CSI RS in a resource block (Resource Block, RB), such as port numbers that occupy different subcarriers, symbols, or sequences; and the subframe configuration may be a period or an offset of a subframe that sends the CSI RS.

For another example, the DM RS resource may be a resource configuration, or may further be a combination of a resource configuration and a subframe configuration. The resource configuration may be a resource configuration of a DM RS in an RB, such as different port numbers; and the subframe configuration may be a period or an offset of a subframe that sends the DM RS. The subframe configuration may be predefined and be known to both the terminal and the first transmission point.

For another example, the CRS resource may be a resource configuration, or may further be a combination of a resource configuration and a subframe configuration. The resource configuration may be a resource configuration of a CRS in an RB, such as different port numbers; and the subframe configuration may be a period or an offset of a subframe that sends the CRS. The subframe configuration may be predefined and be known to both the terminal and the first transmission point.

Optionally, in an optional implementation manner of this embodiment, the receiver 71 may specifically obtain configuration information of the at least two reference signal resources that is sent by the first transmission point by using higher layer signaling (that is, the higher layer signaling is borne by a physical downlink shared channel (Physical Downlink Shared Channel, PDSCH)) or downlink control information (that is, the downlink control information is borne by a physical downlink control channel (Physical Downlink Control Channel, PDCCH) or an enhanced PDCCH (enhanced PDCCH, ePDCCH)), and obtain, according to the configuration information of the at least two reference signal resources, the at least two reference signal resources.

For example, the higher layer signaling may be a radio resource control (Radio Resource Control, RRC) message. Specifically, the configuration information of the at least two reference signal resources may be carried by an information element (Information Element, IE) in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the configuration information of the at least two reference signal resources; or the RRC message may also be different from the existing RRC message in the prior art.

For another example, the higher layer signaling may further be a media access control (Media Access Control, MAC) control element (Control Element, CE) message, and a new MAC CE is added to carry the configuration information of the at least two reference signal resources.

Optionally, in an optional implementation manner of this embodiment, the receiver 71 may be specifically configured to use the at least two reference signal resources to receive a reference signal set or a reference signal subset corresponding to the at least two reference signal resources.

Specifically, the reference signal subset may be an indication that is sent by the first transmission point by using the higher layer signaling or the downlink control information and used to indicate that a part of reference signals are selected from the reference signal set corresponding to the reference signal resources as the reference signal subset; for example, the first reference signal or the first reference signal and the second reference signal in the reference signal set corresponding to the reference signal resources are selected as the reference signal subset.

For example, the higher layer signaling may be an RRC message. Specifically, the indication may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the indication; or the RRC message may also be different from the existing RRC message in the prior art.

For another example, the higher layer signaling may further be a MAC CE message, and a new MAC CE is added to carry the indication.

Specifically, the reference signal subset may be predefined; for example, it is predefined that the first reference signal or the first reference signal and the second reference signal in the reference signal set corresponding to the reference signal resources are selected as the reference signal subset.

Optionally, in an optional implementation manner of this embodiment, the receiver 71 may further be configured to receive first indication information (such as an index value of the first precoding matrix) sent by the first transmission point, where the first indication information is used to indicate the first precoding matrix.

Specifically, the first indication information may specifically be sent by the first transmission point to the terminal by using the higher layer signaling or the downlink control information. The first transmission point may specifically select the first precoding matrix from a predefined precoding matrix set or code book.

For example, the higher layer signaling may be an RRC message. Specifically, the first indication information may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the first indication information; or the RRC message may also be different from the existing RRC message in the prior art.

For another example, the higher layer signaling may further be a MAC CE message, and a new MAC CE is added to carry the first indication information.

Specifically, the index value may be a rank indicator (Rank Indicator, RI) and a precoding matrix indicator (Precoding Matrix Indicator, PMI), or may further be a PMI, which is not limited in this embodiment.

It should be noted that the first precoding matrix may be a precoding matrix indicated by the first indication information, or may further be a part of the precoding matrix indicated by the first indication information, such as a matrix formed by a row or a column of the precoding matrix.

Optionally, in an optional implementation manner of this embodiment, the receiver 71 may further be configured to obtain the first indication information according to a pre-configuration, for example, it is stipulated in a protocol that the first precoding matrix is selected from a predefined precoding matrix set or code book.

Specifically, the first precoding matrix may be a precoding matrix for increasing a beam tilt angle corresponding to the reference signals, so that signal quality of the terminal can be improved; or may also be a precoding matrix for decreasing the beam tilt angle corresponding to the reference signals, so that signal quality of the terminal can be lowered. Therefore, the transmission point currently accessed by the terminal may adjust associations between the terminal, particularly a terminal on the edge of coverage of the transmission point, and the transmission point and between the terminal and one or more other transmission points according to needs.

It should be noted that for the reference signal resources corresponding to the first transmission point and the second transmission point, first precoding matrices corresponding to the reference signal resources may be used respectively for precoding, so that the terminal is capable of obtaining channel quality information more accurately after beam adjustment is performed for the reference signals; and the reference signal resources corresponding to the first transmission point and the second transmission point may also be reference signal resources that are not precoded according to the first precoding matrix, so that signaling overhead can be reduced.

Optionally, in an optional implementation manner of this embodiment, the quality information of the reference signals that is obtained by the processor 72 may include but is not limited to one or more of the following: reference signal received power (Reference Signal Received Power, RSRP), reference signal received quality (Reference Signal Received Quality, RSRQ), a reference signal strength indicator (Reference Signal Strength Indicator, RSSI), and a channel quality indicator (Channel Quality Indicator, CQI).

Optionally, in an optional implementation manner of this embodiment, the sender 73 may specifically send the quality information of the reference signals to the first transmission point by using higher layer signaling, a physical uplink control channel (Physical Uplink Control Channel, PUCCH), or a physical uplink shared channel (Physical Uplink Shared Channel, PUCCH).

For example, the higher layer signaling may be an RRC message. Specifically, the quality information of the reference signals may be carried by an IE in the RRC message. The RRC message may be an RRC message in the prior art, such as an RRC connection reconfiguration complete (RRC CONNECTION RECONFIGURATION COMPLETE) message, which is not limited in this embodiment, and an IE of an existing RRC message is extended to carry the quality information of the reference signals; or the RRC message may also be different from the existing RRC message in the prior art.

For another example, the higher layer signaling may further be a MAC CE message, and a new MAC CE is added to carry the quality information of the reference signals.

In this embodiment, a terminal obtains, by using a processor and according to reference signals sent by a first transmission point and the second transmission point and a first precoding matrix, quality information of the reference signals after a channel corresponding to each transmission point is precoded, so that the terminal is capable of obtaining quality information of precoded reference signals more accurately and the first transmission point switches the terminal to an appropriate second transmission point, thereby implementing flow distribution between all transmission points and improving access reliability of the terminal.

Optionally, in an optional implementation manner of this embodiment, the receiver 71 may further be configured to: after the terminal accesses the second transmission point, receive second indication information sent by the second transmission point and transmit the second indication information to the sender 73, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point; correspondingly, the sender 73 may further be configured to send fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the first transmission point in the second transmission point, where the third precoding matrix matches a second channel, the first channel is a channel between the terminal and the first transmission point, and the second channel is a channel between the terminal and the second transmission point.

The second precoding matrix indicated by the second indication information may include but is not limited to a precoding matrix prohibited from use, a used precoding matrix, or a precoding matrix used to indicate interference.

Specifically, the second indication information may be an index value of the second precoding matrix, and the fourth indication information may be an index value of the one or more other precoding matrices. Specifically, the index value may be a rank indicator (Rank Indicator, RI) and a precoding matrix indicator (Precoding Matrix Indicator, PMI), or may further be a PMI, which is not limited in this embodiment.

Optionally, in an optional implementation manner of this embodiment, the second precoding matrix may include but is not limited to a precoding matrix of the first transmission point over each physical resource block (Physical Resource Block, PRB), a subband, or a system bandwidth.

Optionally, in an optional implementation manner of this embodiment, the third precoding matrix may include but is not limited to a precoding matrix of the second transmission point over each physical resource block (Physical Resource Block, PRB), a subband, or a system bandwidth.

Optionally, the first transmission point may further send the third indication information to the second transmission point by using other signaling or backhaul manners, which are not limited in this embodiment.

Optionally, in an optional implementation manner of this embodiment, the one or more other precoding matrices or the subset of the one or more other precoding matrices indicated by the fourth indication information is a matrix or a subset of the matrix among the third precoding matrix or the subset of the third precoding matrix except the second precoding matrix or the subset of the second precoding matrix indicated by the second indication information, where the third precoding matrix matches the second channel. For example, the one or more other precoding matrices or the subset of the one or more other precoding matrices may be a precoding matrix or a subset of the precoding matrix that is among the third precoding matrix or the subset of the third precoding matrix and is orthogonal to or quasi-orthogonal to the second precoding matrix or the subset of the second precoding matrix, where the third precoding matrix matches the second channel.

In this embodiment, a terminal receives, by using a receiver, second indication information sent by the second transmission point to which the terminal switches, where the second indication information is used to indicate a second precoding matrix or a subset of the second precoding matrix that matches a first channel and is used by the first transmission point, the second indication information is determined by the second transmission point according to received third indication information sent by the first transmission point, and the third indication information is used to indicate the second precoding matrix or the subset of the second precoding matrix that matches the first channel and is used by the first transmission point, so that a sender is capable of feeding back an available precoding matrix more accurately to the second transmission point according to the second precoding matrix or the subset of the second precoding matrix that matches the first channel and is used by the first transmission point, and is capable of effectively avoiding interference in the terminal caused by the second precoding matrix that matches the first channel and is used by the first transmission point, thereby further improving throughput of the terminal and the second transmission point.

Figure 8:
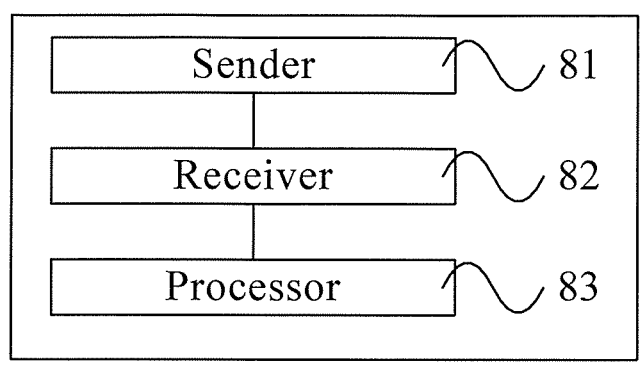
FIG. 8 is a schematic structural diagram of a transmission point according to another embodiment of the present application.

FIG. 8 is a schematic structural diagram of a transmission point according to another embodiment of the present application. As shown in FIG. 8, the transmission point in this embodiment may include a sender 81, a receiver 82, and a processor 83. The sender 81 is configured to send first indication information to a terminal, where the first indication information is used to indicate a first precoding matrix, the first precoding matrix is used to adjust quality of reference signals that are received by the terminal, the reference signals are received by the terminal according to at least two reference signal resources, the at least two reference signal resources are respectively corresponding to different transmitters, the transmitters include the transmission point and at least one second transmission point, and the transmission point is a transmission point currently accessed by the terminal. The receiver 82 is configured to receive quality information of the reference signals that is sent by the terminal and transmit the quality information of the reference signals to the processor 83, where the quality information of the reference signals is obtained by the terminal according to the reference signals and the first precoding matrix that is indicated by the first indication information. The processor 83 is configured to instruct, according to the quality information of the reference signals, the terminal to access a second transmission point.

In a radio communications system, for example, in a heterogeneous network deployment scenario, the transmission point and the at least one second transmission point may have a same cell identifier, or may further have different cell identifiers. That is to say, the at least two reference signal resources may be reference signal resources respectively corresponding to multiple transmission points in one cell, or may also be reference signal resources respectively corresponding to transmission points in different cells.

Optionally, in an optional implementation manner of this embodiment, the reference signal resources may include one or more of the following: a channel state information reference signal (Channel State Information Reference Signal, CSI RS) resource, a demodulation reference signal (DeModulation Reference Signal, DM RS) resource, and a cell-specific reference signal (Cell-specific Reference Signal, CRS) resource.

For example, the CSI RS resource may be a resource configuration, or may further be a combination of a resource configuration and a subframe configuration. The resource configuration may be a resource configuration of a CSI RS in a resource block (Resource Block, RB), such as port numbers that occupy different subcarriers, symbols, or sequences; and the subframe configuration may be a period or an offset of a subframe that sends the CSI RS.

For another example, the DM RS resource may be a resource configuration, or may further be a combination of a resource configuration and a subframe configuration. The resource configuration may be a resource configuration of a DM RS in an RB, such as different port numbers; and the subframe configuration may be a period or an offset of a subframe that sends the DM RS. The subframe configuration may be predefined and be known to both the terminal and the transmission point.

For another example, the CRS resource may be a resource configuration, or may further be a combination of a resource configuration and a subframe configuration. The resource configuration may be a resource configuration of a CRS in an RB, such as different port numbers; and the subframe configuration may be a period or an offset of a subframe that sends the CRS. The subframe configuration may be predefined and be known to both the terminal and the transmission point.

Optionally, in an optional implementation manner of this embodiment, the sender 81 may specifically send configuration information of the at least two reference signal resources to the terminal by using higher layer signaling (that is, the higher layer signaling is borne by a physical downlink shared channel (Physical Downlink Shared Channel, PDSCH)) or downlink control information (that is, the downlink control information is borne by a physical downlink control channel (Physical Downlink Control Channel, PDCCH) or an enhanced PDCCH (enhanced PDCCH, ePDCCH)), so that the terminal obtains the at least two reference signal resources according to the configuration information of the at least two reference signal resources.

For example, the higher layer signaling may be a radio resource control (Radio Resource Control, RRC) message.

Specifically, the configuration information of the at least two reference signal resources may be carried by an information element (Information Element, IE) in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the configuration information of the at least two reference signal resources; or the RRC message may also be different from the existing RRC message in the prior art.

For another example, the higher layer signaling may further be a media access control (Media Access Control, MAC) control element (Control Element, CE) message, and a new MAC CE is added to carry the configuration information of the at least two reference signal resources.

Optionally, in an optional implementation manner of this embodiment, the reference signals may include but are not limited to a reference signal set or a reference signal subset corresponding to the at least two reference signal resources. Specifically, the terminal may specifically use the at least two reference signal resources to receive the reference signal set or the reference signal subset corresponding to the at least two reference signal resources.

Specifically, the reference signal subset may be an indication that is sent by the transmission point by using the higher layer signaling or the downlink control information and used to indicate that a part of reference signals are selected from the reference signal set corresponding to the reference signal resources as the reference signal subset; for example, the first reference signal or the first reference signal and the second reference signal in the reference signal set corresponding to the reference signal resources are selected as the reference signal subset.

For example, the higher layer signaling may be an RRC message. Specifically, the indication may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the indication; or the RRC message may also be different from the existing RRC message in the prior art.

For another example, the higher layer signaling may further be a MAC CE message, and a new MAC CE is added to carry the indication.

Specifically, the reference signal subset may be predefined; for example, it is predefined that the first reference signal or the first reference signal and the second reference signal in the reference signal set corresponding to the reference signal resources are selected as the reference signal subset.

Specifically, the first indication information may specifically be sent by the sender 81 to the terminal by using the higher layer signaling or the downlink control information. The transmission point may specifically select the first precoding matrix from a predefined precoding matrix set or code book.

For example, the higher layer signaling may be an RRC message. Specifically, the first indication information may be carried by an IE in the RRC message. The RRC message may be an RRC message in the prior art, such as an RRC connection reconfiguration (RRC CONNECTION RECONFIGURATION) message, which is not limited in this embodiment, and an IE of an existing RRC message is extended to carry the first indication information; or the RRC message may also be different from the existing RRC message in the prior art.

For another example, the higher layer signaling may further be a MAC CE message, and a new MAC CE is added to carry the first indication information.

Specifically, the index value may be a rank indicator (Rank Indicator, RI) and a precoding matrix indicator (Precoding Matrix Indicator, PMI), or may further be a PMI, which is not limited in this embodiment.

It should be noted that the first precoding matrix may be a precoding matrix indicated by the first indication information, or may further be a part of the precoding matrix indicated by the first indication information, such as a matrix formed by a row or a column of the precoding matrix.

Specifically, the first precoding matrix may be a precoding matrix for increasing a beam tilt angle corresponding to the reference signals, so that signal quality of the terminal can be improved; or may also be a precoding matrix for decreasing the beam tilt angle corresponding to the reference signals, so that signal quality of the terminal can be lowered. Therefore, the transmission point currently accessed by the terminal may adjust associations between the terminal, particularly a terminal on the edge of coverage of the transmission point, and the transmission point and between the terminal and one or more other transmission points according to needs.

It should be noted that for the reference signal resources corresponding to the transmission point and the second transmission point, first precoding matrices corresponding to the reference signal resources may be used respectively for precoding, so that the terminal is capable of obtaining channel quality information more accurately after beam adjustment is performed for the reference signals; and the reference signal resources corresponding to the transmission point and the second transmission point may also be reference signal resources that are not precoded according to the first precoding matrix, so that signaling overhead can be reduced.

Optionally, in an optional implementation manner of this embodiment, the quality information of the reference signals that is received by the receiver 82 may include but is not limited to one or more of the following: reference signal received power (Reference Signal Received Power, RSRP), reference signal received quality (Reference Signal Received Quality, RSRQ), a reference signal strength indicator (Reference Signal Strength Indicator, RSSI), and a channel quality indicator (Channel Quality Indicator, CQI).

Optionally, in an optional implementation manner of this embodiment, the receiver 82 may specifically receive the quality information of the reference signals that is sent by the terminal by using higher layer signaling, a physical uplink control channel (Physical Uplink Control Channel, PUCCH), or a physical uplink shared channel (Physical Uplink Shared Channel, PUCCH).

For example, the higher layer signaling may be an RRC message. Specifically, the quality information of the reference signals may be carried by an IE in the RRC message. The RRC message may be an RRC message in the prior art, such as an RRC connection reconfiguration complete (RRC CONNECTION RECONFIGURATION COMPLETE) message, which is not limited in this embodiment, and an IE of an existing RRC message is extended to carry the quality information of the reference signals; or the RRC message may also be different from the existing RRC message in the prior art.

For another example, the higher layer signaling may further be a MAC CE message, and a new MAC CE is added to carry the quality information of the reference signals.

In this embodiment, a terminal obtains, according to reference signals sent by a transmission point and the second transmission point and a first precoding matrix, quality information of the reference signals after a channel corresponding to each transmission point is precoded, so that the terminal is capable of obtaining quality information of precoded reference signals more accurately and a processor switches the terminal to an appropriate second transmission point, thereby implementing flow distribution between all transmission points and improving access reliability of the terminal.

Optionally, in an optional implementation manner of this embodiment, the sender 81 may further be configured to send third indication information to the second transmission point after the terminal accesses the second transmission point, where the third indication information is used to indicate a second precoding matrix or a subset of the second precoding matrix that matches a first channel and is used by the transmission point, so that:

the second transmission point determines second indication information according to the third indication information, where the second indication information is used to indicate the second precoding matrix or the subset of the second precoding matrix that matches the first channel and is used by the transmission point; and the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the transmission point in the second transmission point, where the third precoding matrix matches a second channel, the first channel is a channel between the terminal and the transmission point, and the second channel is a channel between the terminal and the second transmission point.

In this way, the second transmission point may determine second indication information according to the third indication information, where the second indication information is used to indicate the second precoding matrix or the subset of the second precoding matrix that matches the first channel and is used by the transmission point; and the second transmission point sends the second indication information to the terminal, so that the terminal sends fourth indication information to the second transmission point according to the second indication information, where the fourth indication information is used to indicate one or more other precoding matrices or a subset of the one or more other precoding matrices among a third precoding matrix or a subset of the third precoding matrix except the second precoding matrix or the subset of the second precoding matrix indicated by the second indication information, so that the second transmission point selects an appropriate precoding matrix according to the fourth indication information and precodes downlink data of the terminal by using the selected precoding matrix, so as to reduce interference of the transmission point in the second transmission point, where the third precoding matrix matches a second channel, the first channel is a channel between the terminal and the transmission point, and the second channel is a channel between the terminal and the second transmission point.

The second precoding matrix indicated by the second indication information may include but is not limited to a precoding matrix prohibited from use, a used precoding matrix, or a precoding matrix used to indicate interference.

Specifically, the second indication information may be an index value of the second precoding matrix, and the fourth indication information may be an index value of the one or more other precoding matrices. Specifically, the index value may be a rank indicator (Rank Indicator, RI) and a precoding matrix indicator (Precoding Matrix Indicator, PMI), or may further be a PMI, which is not limited in this embodiment.

Optionally, in an optional implementation manner of this embodiment, the second precoding matrix may include but is not limited to a precoding matrix of the transmission point over each physical resource block (Physical Resource Block, PRB), a subband, or a system bandwidth.

Optionally, in an optional implementation manner of this embodiment, the third precoding matrix may include but is not limited to a precoding matrix of the second transmission point over each physical resource block (Physical Resource Block, PRB), a subband, or a system bandwidth.

Optionally, in an optional implementation manner of this embodiment, the sender 81 may be specifically configured to send the third indication information to the second transmission point through an X2 interface.

Optionally, in an optional implementation manner of this embodiment, specifically, the sender 81 may further send the third indication information to the second transmission point by using other signaling or backhaul manners, which are not limited in this embodiment.

Optionally, in an optional implementation manner of this embodiment, the one or more other precoding matrices or the subset of the one or more other precoding matrices indicated by the fourth indication information is a matrix or a subset of the matrix among the third precoding matrix or the subset of the third precoding matrix except the second precoding matrix or the subset of the second precoding matrix indicated by the second indication information, where the third precoding matrix matches the second channel. For example, the one or more other precoding matrices or the subset of the one or more other precoding matrices may be a precoding matrix or a subset of the precoding matrix that is among the third precoding matrix or the subset of the third precoding matrix and is orthogonal to or quasi-orthogonal to the second precoding matrix or the subset of the second precoding matrix, where the third precoding matrix matches the second channel.

In this embodiment, a transmission point sends third indication information to the second transmission point by using a sender, where the third indication information is used to indicate a second precoding matrix or a subset of the second precoding matrix that matches a first channel and is used by the transmission point; and the second transmission point determines second indication information according to the third indication information and sends the second indication information to the terminal, where the second indication information is used to indicate the second precoding matrix or the subset of the second precoding matrix that matches the first channel and is used by the transmission point, so that the terminal is capable of feeding back an available precoding matrix more accurately to the second transmission point according to the second precoding matrix or the subset of the second precoding matrix that matches the first channel and is used by the transmission point, and is capable of effectively avoiding interference in the terminal caused by the second precoding matrix that matches the first channel and is used by the transmission point, thereby further improving throughput of the terminal and the second transmission point.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other divisions in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit. The integrated unit may be implemented in a form of hardware, or may be implemented in a form of hardware plus a software functional unit.

The integrated unit implemented in a form of software functional unit may be stored in a computer readable storage medium. The foregoing software functional unit is stored in a storage medium and includes several instructions for instructing a computer device (which may be a personal computer, a server, or a network device or the like) or a processor (processor) to perform a part of the steps of the methods described in the embodiments of the present application. The foregoing storage medium includes various mediums capable of storing program code, such as a USB flash drive, a removable hard disk, a read-only memory (Read-Only Memory, ROM), a random access memory (Random Access Memory, RAM), a magnetic disk or an optical disc.

Finally, it should be noted that the foregoing embodiments are merely intended for describing the technical solutions of the present application rather than limiting the present application. Although the present application is described in detail with reference to the foregoing embodiments, a person of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present application.

What is claimed is:

1. An access method, comprising:
obtaining, by a terminal, at least two reference signal resources, wherein the at least two reference signal resources respectively correspond to a first transmission point and at least one second transmission point, and the first transmission point is a transmission point currently accessed by the terminal;
receiving, by the terminal, reference signals by using the at least two reference signal resources;
obtaining, by the terminal, quality information of the reference signals according to a first precoding matrix and the reference signals;
sending, by the terminal, the quality information of the reference signals to the first transmission point;
wherein after the terminal accesses the second transmission point, the method further comprises:
receiving, by the terminal, second indication information sent by the second transmission point, wherein the second indication information is used to indicate a second precoding matrix or a subset of the second precoding matrix that matches a first channel and is used by the first transmission point; and
sending, by the terminal, fourth indication information to the second transmission point according to the second indication information, wherein the fourth indication information is used to indicate a third precoding matrix, or, one or more precoding matrices or a subset of the one or more precoding matrices among a subset of the third precoding matrix except the second precoding matrix or the subset of the second precoding matrix indicated by the second indication information, wherein the third precoding matrix or the subset of the third precoding matrix matches a second channel, the first channel is a channel between the terminal and the first transmission point, and the second channel is a channel between the terminal and the second transmission point.

2. The method according to claim 1, wherein the reference signal resources comprise one or more of the following: a channel state information reference signal (CSI RS) resource, a demodulation reference signal (DM RS) resource, and a cell-specific reference Signal (CRS) resource.

3. The method according to claim 1, wherein receiving, by the terminal, reference signals by using the at least two reference signal resources comprises:
receiving, by the terminal, a reference signal set or a reference signal subset corresponding to the at least two reference signal resources by using the at least two reference signal resources.

4. The method according to claim 1, wherein before obtaining, by the terminal, quality information of the reference signals according to a first precoding matrix and the reference signals, the method further comprises:
receiving, by the terminal, first indication information sent by the first transmission point, wherein the first indication information is used to indicate the first precoding matrix.

5. The method according to claim 1, wherein the quality information of the reference signals comprises one or more of the following: reference signal received power (RSRP), reference signal received quality (RSRQ), a reference signal strength indicator (RSSI), and a channel quality indicator (CQI).

6. A terminal, comprising:
a receiver, configured to obtain at least two reference signal resources, wherein the at least two reference signal resources respectively correspond to a first transmission point and at least one second transmission point, the first transmission point is a transmission point currently accessed by the terminal;
wherein the receiver is further configured to receive reference signals by using the at least two reference signal resources, and transmit the reference signals to a processor;
wherein the processor is configured to obtain quality information of the reference signals according to a first precoding matrix and the reference signals and transmit the quality information of the reference signals to a sender;
wherein the sender is configured to send the quality information of the reference signals to the first transmission point; wherein
the receiver is further configured to:
after the terminal accesses the second transmission point, receive second indication information sent by the second transmission point, and transmit the second indication information to the sender, wherein the second indication information is used to indicate a second precoding matrix or a subset of the second precoding matrix that matches a first channel and is used by the first transmission point; and
the sender is further configured to:
send fourth indication information to the second transmission point according to the second indication information, wherein the fourth indication information is used to indicate a third precoding matrix, or, one or more precoding matrices or a subset of the one or more precoding matrices among a subset of the third precoding matrix except the second precoding matrix or the subset of the second precoding matrix indicated by the second indication information, wherein the third precoding matrix or the subset of the third precoding matrix matches a second channel, the first channel is a channel between the terminal and the first transmission point, and the second channel is a channel between the terminal and the second transmission point.

7. The terminal according to claim 6, wherein the reference signal resources obtained by the receiver comprise one or more of the following: a channel state information reference signal (CSI RS) resource, a demodulation reference signal (DM RS) resource, and a cell-specific reference Signal (CRS) resource.

8. The terminal according to claim 6, wherein the receiver is configured to:
use the at least two reference signal resources to receive a reference signal set or a reference signal subset corresponding to the at least two reference signal resources.

9. The terminal according to claim 6, wherein the receiver is further configured to:
receive first indication information sent by the first transmission point, wherein the first indication information is used to indicate the first precoding matrix.

10. The terminal according to claim 6, wherein the quality information of the reference signals that is obtained by the processor comprises one or more of the following: reference signal received power (RSRP), reference signal received quality (RSRQ), a reference signal strength indicator (RSSI), and a channel quality indicator (CQI).

11. A transmission point, comprising:
a sender, configured to send first indication information to a terminal, wherein the first indication information is used to indicate a first precoding matrix, the first precoding matrix is used to adjust quality of reference signals that are received by the terminal, the reference signals are received by the terminal according to at least two reference signal resources, the at least two reference signal resources are respectively corresponding to different transmission units, the transmission units comprise the transmission point and at least one second transmission point, and the transmission point is a transmission point currently accessed by the terminal;
a receiver, configured to receive quality information of the reference signals that is sent by the terminal and transmit the quality information of the reference signals to a processor, wherein the quality information of the reference signals is obtained by the terminal according to the reference signals and the first precoding matrix that is indicated by the first indication information;
wherein the processor is configured to instruct, according to the quality information of the reference signals, the terminal to access a second transmission point;
wherein the sender is further configured to:
send third indication information to the second transmission point, wherein the third indication information is used to indicate a second precoding matrix or a subset of the second precoding matrix that matches a first channel and is used by the transmission point.

12. The transmission point according to claim 11, wherein the reference signal resources comprise one or more of the following: a channel state information reference signal (CSI RS) resource, a demodulation reference signal (DM RS) resource, and a cell-specific reference Signal (CRS) resource.

13. The transmission point according to claim 11, wherein the reference signals comprise a reference signal set or a reference signal subset corresponding to the at least two reference signal resources.

14. The transmission point according to claim 11, wherein the quality information of the reference signals that is received by the receiver comprises one or more of the following: reference signal received power (RSRP), reference signal received quality (RSRQ), a reference signal strength indicator (RSSI), and a channel quality indicator (CQI).

15. The transmission point according to claim 11, wherein the sender is configured to:
send the third indication information to the second transmission point through an X2 interface.

16. A transmission point, comprising:
a receiver, configured to receive third indication information from another transmission point, wherein the third indication information is used to indicate a second precoding matrix or a subset of the second precoding matrix that matches a first channel and is used by the another transmission point;
a sender, configured to send a second indication information to a terminal, wherein the second indication information is used to indicate the second precoding matrix or the subset of the second precoding matrix that matches the first channel and is used by the another transmission point;

the receiver further configured to receive fourth indication information from the terminal, wherein the fourth indication information is used to indicate a third precoding matrix, or, one or more precoding matrices or a subset of the one or more precoding matrices among a subset of the third precoding matrix except the second precoding matrix or the subset of the second precoding matrix indicated by the second indication information, wherein the third precoding matrix or the subset of the third precoding matrix matches a second channel; and a processer, configured to select a precoding matrix according to the fourth indication information and precode downlink data of the terminal by using the selected precoding matrix, wherein the first channel is a channel between the terminal and the another transmission point, and the second channel is a channel between the terminal and the second transmission point.

17. The transmission point according to claim 16, wherein the receiver is further configured to receive the third indication information from the another transmission point through an X2 interface.

\* \* \* \* \*